(12) United States Patent
Horn et al.

(10) Patent No.: US 11,849,469 B2
(45) Date of Patent: Dec. 19, 2023

(54) ORBITAL ANGULAR MOMENTUM CAPABILITY IN MILLIMETER WAVE AND HIGHER FREQUENCY BANDS

(71) Applicant: QUALCOMM Incorporated, San Diego, CA (US)

(72) Inventors: Idan Michael Horn, Hod Hasharon (IL); Danlu Zhang, Rancho Santa Fe, CA (US); Shay Landis, Hod Hasharon (IL); Yehonatan Dallal, Kfar Saba (IL); Ran Berliner, Kfar-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/352,047

(22) Filed: Jun. 18, 2021

(65) Prior Publication Data
US 2022/0408426 A1   Dec. 22, 2022

(51) Int. Cl.
*H04W 72/04* (2009.01)
*H04W 72/51* (2023.01)
*H04W 76/14* (2018.01)
*H04B 7/0408* (2017.01)
(Continued)

(52) U.S. Cl.
CPC .......... *H04W 72/51* (2023.01); *H04B 7/0408* (2013.01); *H04B 7/10* (2013.01); *H04W 72/046* (2013.01); *H04W 76/14* (2018.02)

(58) Field of Classification Search
CPC . H04W 72/048; H04W 72/046; H04W 76/14; H04W 72/51; H04B 7/0408; H04B 7/10; H04B 7/0617
See application file for complete search history.

(56) References Cited

U.S. PATENT DOCUMENTS

| | | | |
|---|---|---|---|
| 1,120,221 A | * | 12/1914 | Murray .................. H01H 85/30 337/241 |
| 8,432,884 B1 | | 4/2013 | Ashrafi |
| 8,743,984 B2 | | 6/2014 | Djordjevic et al. |

(Continued)

FOREIGN PATENT DOCUMENTS

| CN | 110266354 A | 9/2019 |
|---|---|---|
| EP | 3567783 A1 | 11/2019 |

(Continued)

OTHER PUBLICATIONS

Co-pending U.S. Appl. No. 17/351,526, inventor Horn; Idan, filed Jun. 18, 2021.

(Continued)

*Primary Examiner* — Kenneth T Lam
(74) *Attorney, Agent, or Firm* — Procopio, Cory, Hargreaves & Savitch LLP/QUALCOMM Incorporated

(57) ABSTRACT

Apparatus, methods, and computer-readable media are disclosed herein for orbital angular moment capability in millimeter wave and higher frequency bands. An example method for wireless communication at a first communication device includes transmitting, to a second communication device, OAM capability information indicating a capability to receive an OAM waveform. Additionally, the example method includes receiving one or more OAM transmissions from the second communication device, the one or more OAM transmissions based on the OAM capability information.

77 Claims, 17 Drawing Sheets

(51) Int. Cl.
*H04B 7/10* (2017.01)
*H04W 72/044* (2023.01)

(56) References Cited

U.S. PATENT DOCUMENTS

| | | | |
|---|---|---|---|
| 9,031,151 B1 | 5/2015 | Harris et al. | |
| 9,077,577 B1 | 7/2015 | Ashrafi et al. | |
| 9,379,926 B2 | 6/2016 | Berretta et al. | |
| 9,838,128 B1 | 12/2017 | Rusch et al. | |
| 10,371,508 B1 | 8/2019 | Ulander et al. | |
| 11,088,752 B1* | 8/2021 | Klemes | H04L 27/2654 |
| 11,139,867 B2 | 10/2021 | Sasaki et al. | |
| 11,152,991 B2* | 10/2021 | Ashrafi | H01Q 21/065 |
| 11,170,318 B2 | 11/2021 | Ashrafi | |
| 11,202,211 B2 | 12/2021 | Sasaki et al. | |
| 11,202,335 B2 | 12/2021 | Ashrafi | |
| 11,228,363 B2 | 1/2022 | Sasaki et al. | |
| 11,283,522 B2 | 3/2022 | Ashrafi | |
| 11,342,976 B1 | 5/2022 | Dallal et al. | |
| 11,368,198 B2 | 6/2022 | Hirabe | |
| 11,438,032 B2* | 9/2022 | Zenkyu | H04B 7/0697 |
| 2003/0137645 A1 | 7/2003 | Fluckiger | |
| 2005/0239426 A1 | 10/2005 | Berretta et al. | |
| 2009/0227252 A1 | 9/2009 | Fenech et al. | |
| 2010/0073260 A1 | 3/2010 | Fujita | |
| 2012/0295538 A1 | 11/2012 | Arcidiacono et al. | |
| 2012/0307933 A1 | 12/2012 | Djordjevic et al. | |
| 2013/0027034 A1 | 1/2013 | Elgort et al. | |
| 2013/0235885 A1 | 9/2013 | Chen et al. | |
| 2013/0285853 A1 | 10/2013 | Lee | |
| 2014/0016181 A1 | 1/2014 | Dal Negro | |
| 2014/0199066 A1 | 7/2014 | Martelli et al. | |
| 2014/0205283 A1 | 7/2014 | Djordjevic et al. | |
| 2014/0348423 A1 | 11/2014 | Ishiga | |
| 2015/0030280 A1 | 1/2015 | Alu et al. | |
| 2015/0055961 A1 | 2/2015 | Meyers et al. | |
| 2015/0084636 A1 | 3/2015 | Popescu | |
| 2015/0146815 A1 | 5/2015 | Berretta et al. | |
| 2015/0194735 A1 | 7/2015 | Graceffo | |
| 2015/0304152 A1 | 10/2015 | Chen et al. | |
| 2015/0357710 A1 | 12/2015 | Li | |
| 2015/0372398 A1* | 12/2015 | Dudorov | H01Q 19/17 342/368 |
| 2016/0043794 A1 | 2/2016 | Ashrafi et al. | |
| 2016/0044647 A1 | 2/2016 | Ashrafi et al. | |
| 2016/0254897 A1 | 9/2016 | Berretta et al. | |
| 2016/0292472 A1 | 10/2016 | Tamburini et al. | |
| 2017/0026095 A1 | 1/2017 | Ashrafi et al. | |
| 2017/0126460 A1 | 5/2017 | Dutronc et al. | |
| 2017/0181183 A1 | 6/2017 | Sung et al. | |
| 2017/0187442 A1 | 6/2017 | Luddy et al. | |
| 2017/0331532 A1 | 11/2017 | Le-Ngoc | |
| 2017/0353265 A1 | 12/2017 | Mansouri Rad et al. | |
| 2018/0026817 A1 | 1/2018 | Graceffo et al. | |
| 2018/0234285 A1 | 8/2018 | Djordjevic et al. | |
| 2019/0020434 A1 | 1/2019 | Adachi et al. | |
| 2019/0028165 A1 | 1/2019 | Adachi et al. | |
| 2019/0149251 A1 | 5/2019 | Zenkyu | |
| 2019/0165837 A1 | 5/2019 | Son et al. | |
| 2019/0165849 A1 | 5/2019 | Ashrafi et al. | |
| 2019/0198999 A1* | 6/2019 | Ashrafi | H04J 11/0036 |
| 2019/0334609 A1 | 10/2019 | Alavi et al. | |
| 2020/0127709 A1 | 4/2020 | Klemes | |
| 2020/0127729 A1 | 4/2020 | Klemes | |
| 2020/0228195 A1 | 7/2020 | Sasaki et al. | |
| 2020/0296599 A1 | 9/2020 | Sasaki et al. | |
| 2020/0313307 A1 | 10/2020 | Lee et al. | |
| 2020/0388935 A1 | 12/2020 | Lee et al. | |
| 2021/0028965 A1 | 1/2021 | Dutronc et al. | |
| 2021/0058118 A1 | 2/2021 | Sasaki et al. | |
| 2021/0211168 A1 | 7/2021 | Sasaki et al. | |
| 2021/0288699 A1 | 9/2021 | Hirabe | |
| 2021/0320707 A1 | 10/2021 | Kamiya | |
| 2021/0399766 A1 | 12/2021 | Zenkyu et al. | |
| 2022/0029301 A1 | 1/2022 | Dallal et al. | |
| 2022/0029697 A1 | 1/2022 | Bakr et al. | |
| 2022/0078780 A1* | 3/2022 | Choi | H04B 7/10 |
| 2022/0123803 A1 | 4/2022 | Rimalapudi et al. | |

FOREIGN PATENT DOCUMENTS

| | | |
|---|---|---|
| JP | 2018037744 A | 3/2018 |
| JP | 2019062297 A | 4/2019 |
| WO | 2021077921 A1 | 4/2021 |
| WO | 2021104518 A1 | 6/2021 |

OTHER PUBLICATIONS

Co-pending U.S. Appl. No. 17/351,819, inventor Horn; Idan, filed Jun. 18, 2021.
Co-pending U.S. Appl. No. 17/351,883, inventor Landis; Shay, filed Jun. 18, 2021.
International Search Report and Written Opinion—PCT/US2022/030214—ISA/EPO—dated Sep. 13, 2022.
International Search Report and Written Opinion—PCT/US2022/030352—ISA/EPO—dated Aug. 26, 2022.
International Search Report and Written Opinion—PCT/US2022/030378—ISA/EPO—dated Aug. 24, 2022.
Partial International Search Report—PCT/US2022/030214—ISA/EPO—dated Aug. 22, 2022.
Rui C., et al., "Spectral and Energy Efficiency of Line-of-Sight OAM-MIMO Communication Systems", China Communications, China Institute of Communications, Piscatway, NJ, USA, vol. 17, No. 9, Sep. 1, 2020 (Sep. 1, 2020), pp. 119-127, XP011811373, ISSN: 1673-5447, DOI: 10.23919/JCC.2020.09.010 [retrieved on Sep. 25, 2020] p. 121, right-hand column, line 7-p. 125, right-hand column, line 25, 1,2 figures.
Tamburini F., et al., "Encoding Many Channels on the Same Frequency Through Radio Vorticity: First Experimental Test", New Journal of Physics, IOP Institute of Physics, 2012, 18 Pages.
Vasnetsov M.V., et al., "Analysis of Orbital Angular Momentum of a Misaligned Optical Beam", New Journal of Physics, vol. 7, No. 46, 2005, pp. 1-17.
Wikipedia: "Orbital Angular Momentum of Light", Last Edited on May 20, 2021, pp. 1-9.
Yang Q., et al., "Capacity Analysis of OAM Millimeter Wave System in the Off-axis Misalignment Case", 2019 IEEE International Conference on Consumer Electronics—Taiwan (ICCE-TW), IEEE, May 20, 2019, pp. 1-2, XP033712642, the whole document.

* cited by examiner

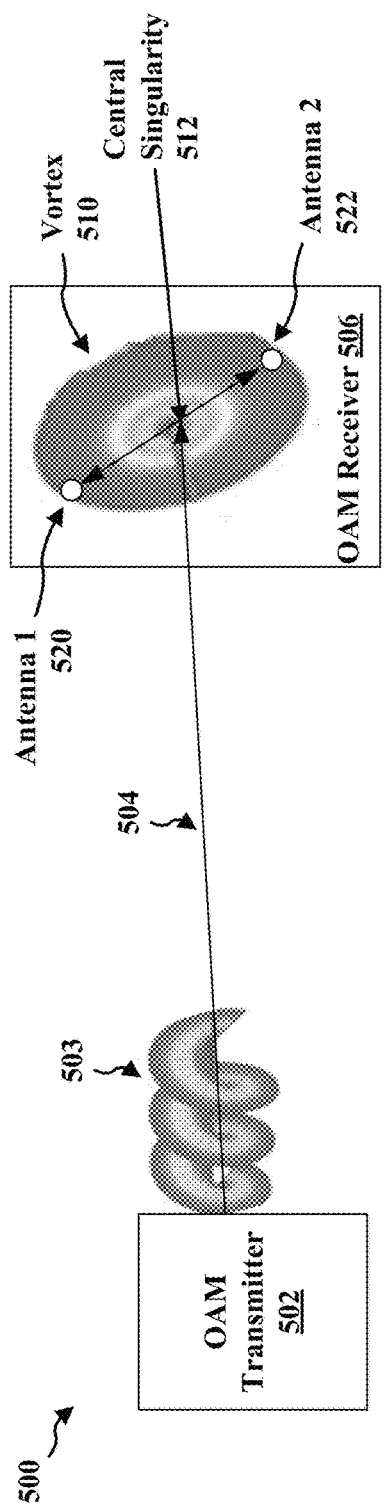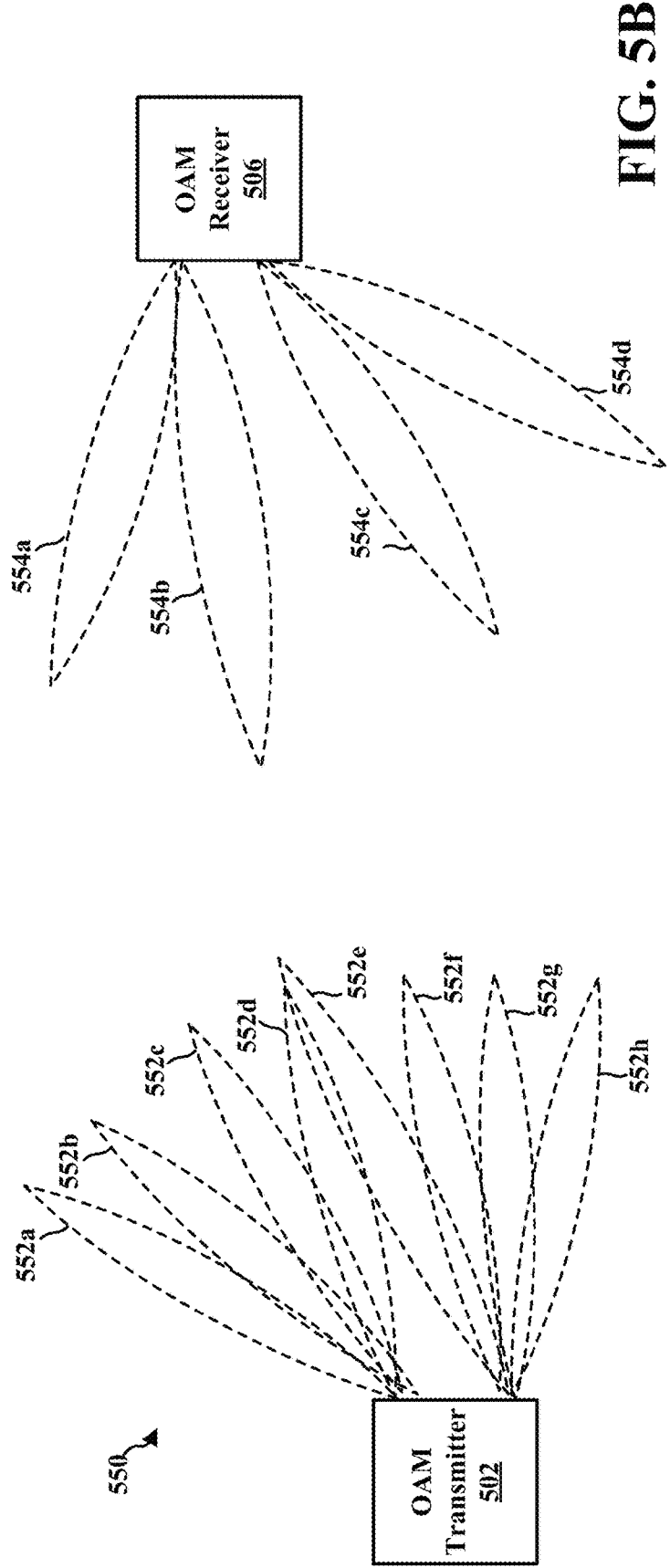
FIG. 5A
FIG. 5B

| Index Parameter Value | OAM Beam Indices |
|---|---|
| 1 | 0 |
| 2-1 | 0, -1 |
| 2-2 | 0, +1 |
| 3 | 0, -1, +1 |
| 4-1 | 0, -1, +1, -2 |
| 4-2 | 0, -1, +1, +2 |
| 4-3 | ... |

FIG. 10

ORBITAL ANGULAR MOMENTUM CAPABILITY IN MILLIMETER WAVE AND HIGHER FREQUENCY BANDS

INTRODUCTION

The present disclosure relates generally to communication systems, and more particularly, to wireless communication utilizing orbital angular momentum (OAM) beams.

Wireless communication systems are widely deployed to provide various telecommunication services such as telephony, video, data, messaging, and broadcasts. Typical wireless communication systems may employ multiple-access technologies with the capability to support communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method is provided for wireless communication at a first communication device. The example method includes transmitting, to a second communication device, orbital angular momentum (OAM) capability information indicating a capability to receive an OAM waveform. Additionally, the example method includes receiving one or more OAM transmissions from the second communication device, the one or more OAM transmissions based on the OAM capability information.

In another aspect of the disclosure, an apparatus is provided for wireless communication at a first communication device. The example apparatus includes means for transmitting, to a second communication device, OAM capability information indicating a capability to receive an OAM waveform. Additionally, the example apparatus includes means for receiving one or more OAM transmissions from the second communication device, the one or more OAM transmissions based on the OAM capability information.

In another aspect of the disclosure, an apparatus comprising a memory and at least one processor coupled to the memory is provided for wireless communication at a first communication device. The at least one processor is configured to transmit, to a second communication device, OAM capability information indicating a capability to receive an OAM waveform. Additionally, the example at least one processor is configured to receive one or more OAM transmissions from the second communication device, the one or more OAM transmissions based on the OAM capability information.

In another aspect of the disclosure, a computer-readable storage medium storing computer executable is provided for wireless communication at a first wireless device. The example code, when executed, causes a processor to transmit, to a second communication device, OAM capability information indicating a capability to receive an OAM waveform. Additionally, the example code, when executed, cause the processor to receive one or more OAM transmissions from the second communication device, the one or more OAM transmissions based on the OAM capability information.

In an aspect of the disclosure, a method is provided for wirelessly transmitting, to a first communication device, one or more OAM transmissions from a second communication device. The example method includes receiving, from the first communication device, OAM capability information indicating a capability to receive an OAM waveform. Additionally, the example method includes transmitting, to the first communication device, one or more OAM transmissions based on the OAM capability information received from the first communication device.

In another aspect of the disclosure, an apparatus is provided for wirelessly transmitting, to a first communication device, one or more OAM transmissions from a second communication device. The example apparatus includes means for receiving, from the first communication device, OAM capability information indicating a capability to receive an OAM waveform. Additionally, the example apparatus includes means for transmitting, to the first communication device, one or more OAM transmissions based on the OAM capability information received from the first communication device.

In another aspect of the disclosure, an apparatus comprising a memory and at least one processor coupled to the memory is provided for wirelessly transmitting, to a first communication device, one or more OAM transmissions from a second communication device. The at least one processor is configured to receive, from the first communication device, OAM capability information indicating a capability to receive an OAM waveform. Additionally, the example at least one processor is configured to transmit, to the first communication device, one or more OAM transmissions based on the OAM capability information received from the first communication device.

In another aspect of the disclosure, a computer-readable storage medium storing computer executable is provided for wirelessly transmitting, to a first communication device, one or more OAM transmissions from a second communication device. The example code, when executed, causes a processor to receive, from the first communication device, OAM capability information indicating a capability to receive an OAM waveform. Additionally, the example code, when executed, cause the processor to transmit, to the first communication device, one or more OAM transmissions based on the OAM capability information received from the first communication device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5A depicts an example of an OAM transmission including a transmitter, in accordance with various aspects of the present disclosure.

FIG. 5B depicts an example of an OAM transmitter in communication with an OAM receiver via an OAM transmission, in accordance with various aspects of the present disclosure.

FIG. 10 depicts an example table of index parameter value to OAM beam indices mapping, in accordance with various aspects of the present disclosure.

DETAILED DESCRIPTION

Figure 1:
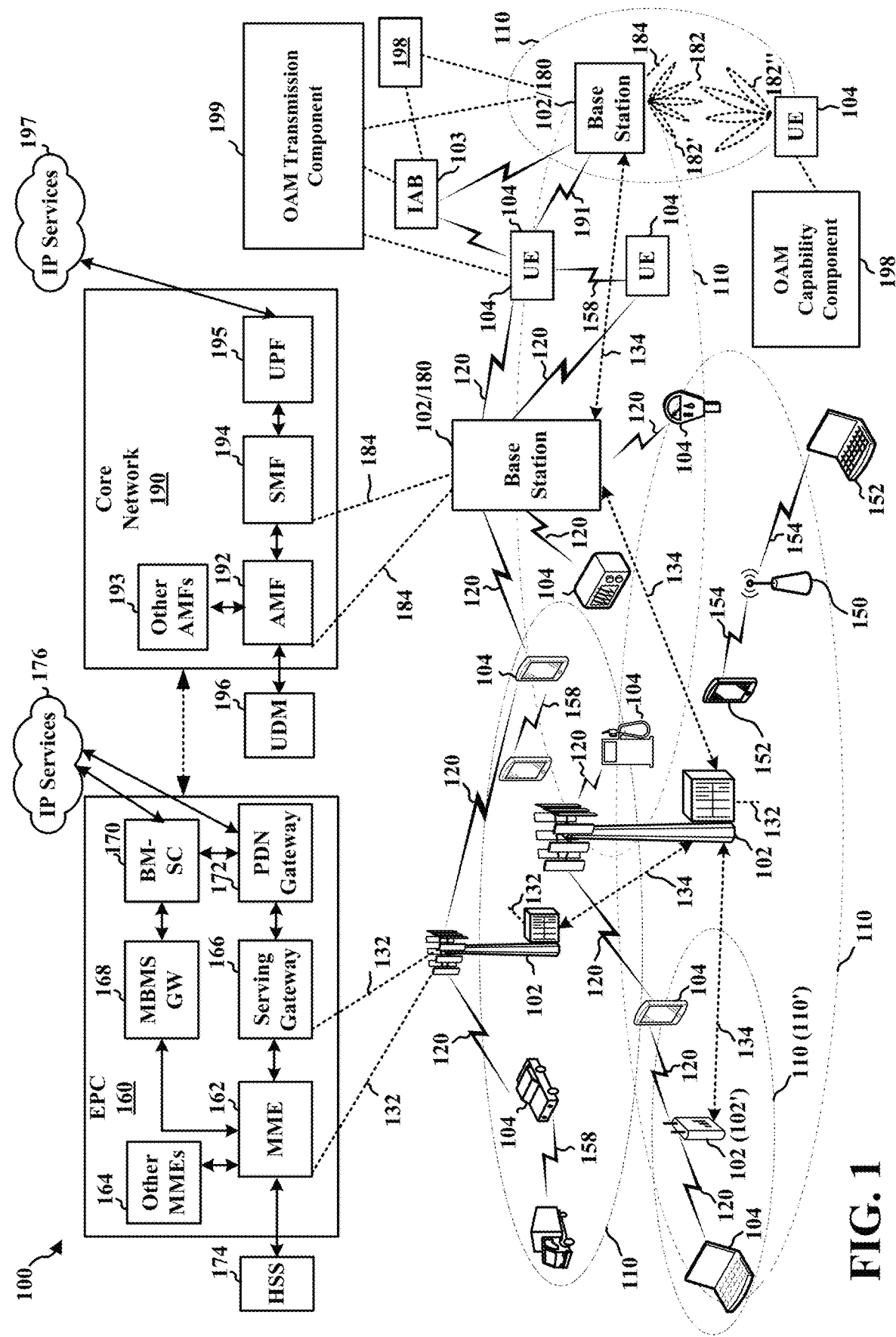
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

In wireless communications, a waveform may be applied to the electromagnetic waves corresponding to downlink, uplink, and/or sidelink transmissions. Examples of waveforms include cyclic prefix (CP) orthogonal frequency division multiplexing (OFDM) (CP-OFDM) and discrete Fourier transform (DFT) spread OFDM (DFT-s-OFDM) (also referred to as single carrier frequency-division multiple access (SC-FDMA). Applying CP-OFDM may be beneficial for high throughput scenarios, while applying DFT-s-OFDM may be beneficial for power limited scenarios or when limited to a single stream transmission.

Another example of a waveform that may be applied to a transmission is transmitting or emitting the electromagnetic waves to carry an orbital angular momentum (OAM) associated with a helical structure of a wavefront around an axis of a beam. As one example, the OAM of a light beam may correspond to a component of angular momentum of the light beam that is based on the field spatial distribution rather than polarization. In addition to light, a radio frequency signal may have an OAM helical structure. The radio frequency (RF) signal may be a signal for wireless communication and comprise a beamformed signal that may be referred to herein as a "beam." The helical structure of the beam may be characterized by a wavefront that is shaped as a helix with a vortex in the center (e.g., at the beam axis).

A helical structure of a signal may be characterized by a topological charge "m" that corresponds to a number of rotations that a helical structure exhibits in a path circling once around the center of a receiver. The topological charge m may comprise an integer and may be positive or negative depending on the direction in which the helical structure twists around the beam axis. The higher the value of the topological charge m, the faster the phase of the wavefront rotates around a beam axis. The helical structure may also be characterized by an optical phase distribution and an intensity distribution corresponding to the topological charge m.

OAM beams may be useful as a transmission scheme for line-of-sight transmissions in a wireless communication network. For example, OAM transmissions (also referred to as "OAM waveforms") may be useful for higher bands, such as the millimeter wave frequency band or higher frequency bands (e.g., FR2, FR4, etc.).

Aspects disclosed herein provide a framework to facilitate a wireless communication device to indicate whether the wireless communication device has the capability to communicate using OAM transmissions. For example, aspects presented herein provide for a first wireless communication device to transmit OAM capability information to a second wireless communication device. Based on the OAM capability information, the first wireless communication device and the second wireless communication device may communicate using OAM transmissions or non-OAM transmissions (e.g., signals on which OAM is not applied).

The first wireless communication device may transmit the OAM capability information after establishing a connection with the second wireless communication device. The OAM capability information may include one or more parameters that indicate OAM capabilities of the first wireless communication device. For example, the OAM capability information may include an OAM capability parameter that indicates whether the first wireless communication device has the capability to receive and separate different OAM beams. In some examples, the OAM capability information may include an OAM beams parameter that indicates a quantity of OAM beams that the first wireless communication device supports. In some examples, the OAM capability information may include an index parameter that indicates an index for each of one or more OAM beams that the first wireless communication device supports. In some examples, the OAM capability information may include antenna description parameters that indicate a type of antenna array of the first wireless communication device for communicating using OAM beams and/or information regarding physical aspects of the antenna array of the first wireless communication device, such as a quantity of antenna elements of the antenna array, a radius associated with the antenna array, and/or a distance between one or more antenna elements of the antenna array. In some examples, the OAM capability information may include a misalignment corrections parameter that indicates that the first wireless communication device has the capability to correct misalignment of OAM beams at the first wireless communication device or lacks the capability to correct misalignment of OAM beams. In some examples, the OAM capability information may include a polarizations parameter that indicates a quantity of polarizations supported by the first communication device, a quantity of polarizations supported per OAM index, and/or a type of polarization supported per OAM index.

Aspects disclosed herein facilitate a wireless communication device indicating a capability to use OAM beams to communicate or a lack thereof. When the wireless communication device indicates a capability to use OAM beams, communication between a transmitting device and a receiving device may be OAM-based, which may enable the transmitting device to use multiple streams for communication, which may improve communication performance by, for example, increasing throughput (e.g., higher data rates and/or capacity) and/or improving spectral efficiency.

FIG. 1 is a diagram illustrating an example of a wireless communications system and an access network 100 including base stations 102/180 and UEs 104. The wireless communications system and access network 100 may include one or more UEs 104 in communication with a base station 102 or 180. The wireless communications system and access network 100 may include UEs 104 in communication with other UEs 104. The wireless communications system and access network 100 may include an integrated access and backhaul (IAB) network that includes multiple cells in communication with each other to provide an access network and a backhaul network to a core network, such as a core network 190 or Evolved Packet Core (EPC) 160. The core network 190 may be a 5G Core (5GC), e.g., a core network that supports new radio (NR) communication or another type of core network. The IAB network may include one or more IAB nodes 103. The IAB nodes may exchange communication with other IAB nodes 103, with a base station 102 or 180, and/or with UEs 104.

In some examples, the wireless communications system and access network 100 may employ an open RAN (O-RAN) to provide a standardization of radio interfaces to procure interoperability between component radio equipment. For example, in an O-RAN, the RAN may be disaggregated into a centralized unit (O-CU), a distributed unit (O-DU), and a radio unit (O-RU). The O-RU is where radio frequency (RF) signals are transmitted, received, amplified, and/or digitized. The O-RU may be located at, near, or integrated with, an antenna. The O-DU and the O-CU provide computational functions and may facilitate the transmission of digitized radio signals within the network. The O-DU may be physically located at or near the O-RU. The O-CU may be located near the core network.

The O-DU provides downlink and uplink baseband processing, a supply system synchronization clock, signal processing, and an interface with the O-CU. The O-RU provides downlink baseband signal conversion to an RF signal, and uplink RF signal conversion to a baseband signal. The O-RAN may include an open fronthaul (FH) interface between the O-DU and the O-RU.

In some examples, a wireless communication device may be configured to manage one or more aspects of wireless communication by indicating a capability of or inability to communicate using OAM transmissions 191. FIG. 1 illustrates a non-limiting example in which the wireless communication device may be a UE 104 that transmits OAM capability information to a base station 102/180. The example is merely to illustrate the concept of a wireless communication device that is configured to indicate an ability or inability to communicate using OAM transmissions. The aspects may be applied for any communication device that receives wireless communications based on an OAM signal. For example, aspects described in connection with the UE 104 may be performed by other communication devices, such as a base station 102/180 operating as a receiver, a relay node (e.g., an integrated access and backhaul (IAB) node), etc. As an example, in FIG. 1, the UE 104 may include an OAM capability component 198 configured to transmit, to a second communication device, OAM capability information indicating a capability to receive an OAM waveform. The example OAM capability component 198 may also be configured to receive one or more OAM transmissions from the second communication device, the one or more OAM transmissions based on the OAM capability information.

Still referring to FIG. 1, in some examples, a wireless communication device, such as a base station 102/180, may be configured to manage one or more aspects of wireless communication by transmitting signals to a receiving device based on a capability or inability of the receiving device to receive OAM transmissions. As an example, in FIG. 1, the base station 102/180 may include an OAM transmission component 199 configured to receive, from the first communication device, OAM capability information indicating a capability to receive an OAM waveform. The example OAM transmission component 199 may also be configured to transmit, to the first communication device, one or more OAM transmissions based on the OAM capability information received from the first communication device.

Although the following description provides examples directed to 5G NR, the concepts described herein may be applicable to other similar areas, such as LTE, LTE-A, CDMA, GSM, and/or other wireless technologies, in which a first communication device receives an OAM transmission from a second communication device. Additionally, the following aspects may be applicable to an aggregated RAN and/or to a disaggregated RAN (e.g., an O-RAN).

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
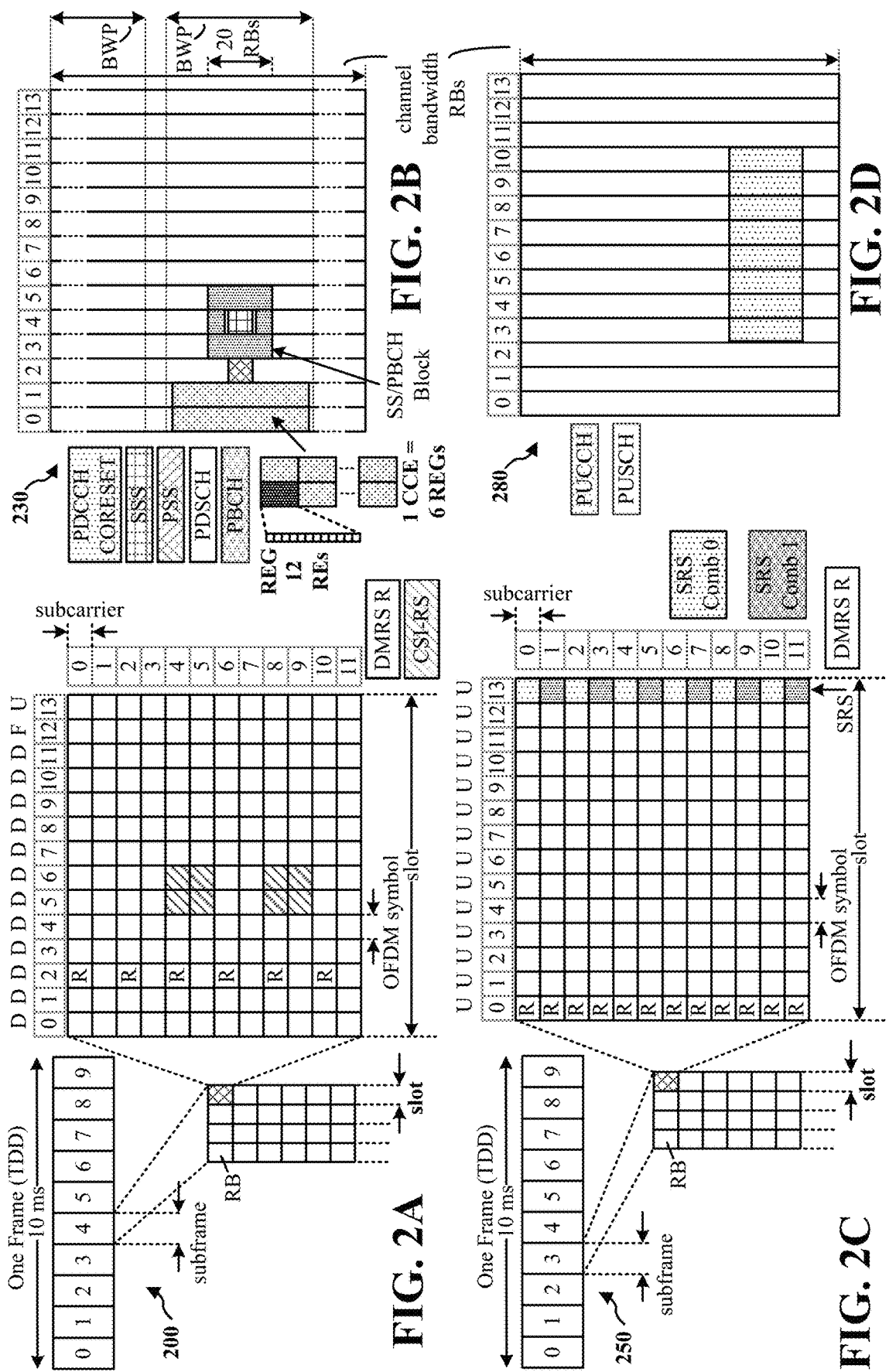
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Aspects presented herein may be applied by a receiver for the reception of wireless communication based on an OAM signal. In some examples, the receiver may be a UE receiving wireless communication from a base station or from another UE. In other examples, the receiver may be a base station, for example, receiving the OAM signal from a UE. In other examples, the receiver may be a relay node (e.g., an IAB node), for example, receiving the OAM signal from a parent node, a child node, a UE, etc.

Figure 3:
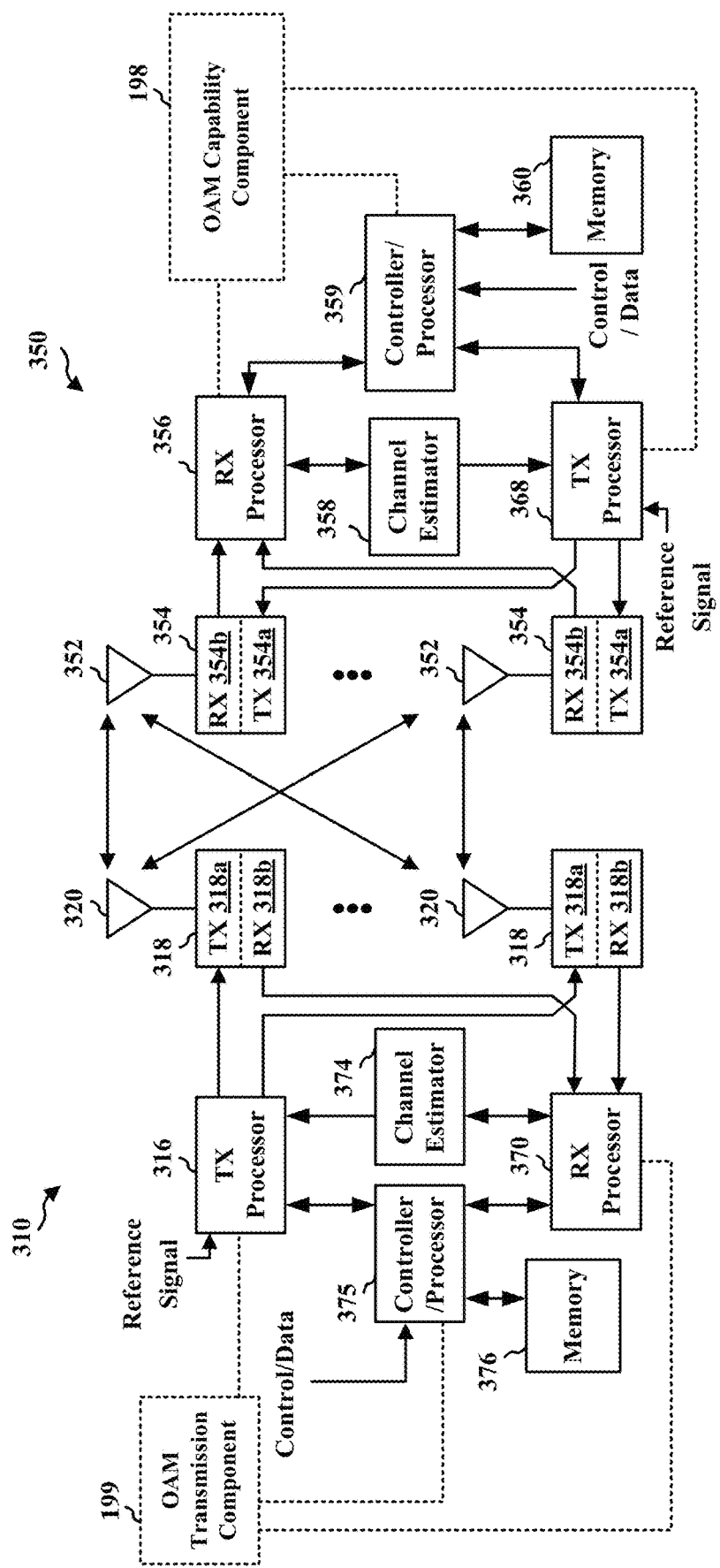
FIG. 3 is a diagram illustrating an example of a base station and user equipment (UE) in an access network.

FIG. 3 is a block diagram that illustrates an example of a first wireless communication device that is configured to exchange wireless communication with a second wireless communication device. In the illustrated example, the first wireless communication device may comprise a base station 310, the second wireless communication device may comprise a UE 350, and the base station 310 and the UE 350 may be in communication in an access network. As shown in FIG. 3, the base station 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example UE 350 includes antennas 352, a transceiver 354 including a transmitter 354a and a receiver 354b, an RX processor 356, a channel estimator 358, a controller/processor 359, memory 360, and a TX processor 368. The antennas 320, 352 may correspond to antenna elements and/or antenna arrays, described in connection with FIGS. 5A, 5B, 6, 7, and/or 8. In other examples, the base station 310 and/or the UE 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor and the RX processor implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318a. Each transmitter 318a may modulate an RF carrier with a respective spatial stream for transmission.

At the UE 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the OAM capability component 198 of FIG. 1.

At least one of the TX processor 316, the RX processor 370, and the controller/processor 375 may be configured to perform aspects in connection with the OAM transmission component 199 of FIG. 1.

Electromagnetic waves may be emitted or transmitted to carry an orbital angular momentum (OAM) associated with a helical structure of a wavefront around an axis of a beam. As an example, the OAM of a light beam may correspond to a component of angular momentum of the light beam that is based on the field spatial distribution rather than polarization. In addition to light, an RF signal may have an OAM helical structure. The RF signal may be a signal for wireless communication and comprise a beamformed signal that may be referred to herein as a "beam." The helical structure of the beam may be characterized by a wavefront that is shaped as a helix with a vortex in the center (e.g., at the beam axis). The beams may be characterized by an integer number of times that the phase of the wavefront rotates around the beam axis. The spatial phase dependence factor of an OAM beam may be characterized by Equation 1 below.

$$\Phi(\theta)=e^{im\theta} \quad \text{Equation 1}$$

In Equation 1, the parameter "θ" represents the angle measure around the axis (e.g., the beam axis). The parameter "m" represents a topological charge and corresponds to a number of rotations that a helical structure (sometimes referred to as a "helical beam" or "helical wavefront") exhibits in a path circling once around the center of a receiver. The topological charge may comprise an integer and may be positive or negative depending on the direction in which the helical structure twists. The higher the value of the topological charge m, the faster the phase of the wavefront rotates around a beam axis. As an example, for OAM for light, the wavefront rotates around a beam axis. For an example with a radio frequency OAM, the beam axis may refer to an axis of the RF signal beam. The parameter "mθ" represents the phase difference acquired over the course of a cycle for the topological charge m.

Figure 4:
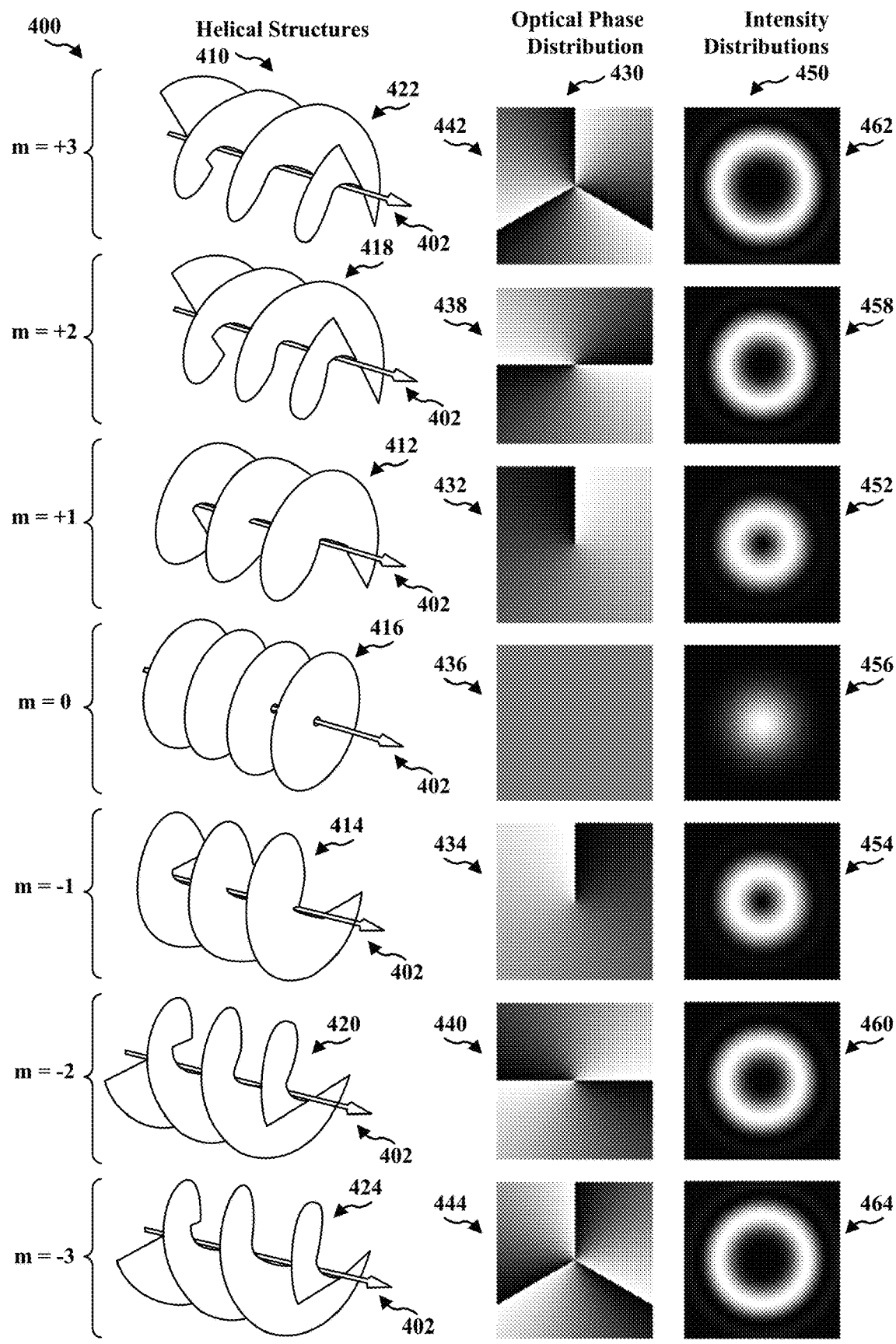
FIG. 4 is a diagram depicting example helical structures and corresponding optical phase distributions and intensity distributions, in accordance with various aspects of the present disclosure.

FIG. 4 is a diagram 400 depicting examples of different helical structures 410 and corresponding optical phase distributions 430 and intensity distributions 450. Each of the helical structures 410 depicts a shape of the helical structure and may be characterized by the topological charge m. Each of the optical phase distributions 430 depict the corresponding optical phase distributions in a beam cross-section. Each of the intensity distributions 450 depict the light intensity distribution in a beam cross-section. In some examples, the intensity distributions 450 may be referred to as a "vortex."

For example, a first helical structure 412 ("m=+1") is characterized by one rotation of phase around a beam axis 402, and in a first direction. A first optical phase distribution 432 corresponding to the first helical structure 412 indicates one cycle. That is, if a receiving element is placed perpendicular to the beam axis 402, the phase measured at the receiving element indicates that the first helical structure 412 is shaped as a single helical surface and completes one cycle (e.g. 0 to 2π) of phase rotation around the beam axis 402. A first intensity distribution 452 corresponding to the first helical structure 412 indicates a luminous intensity measured at the receiving element for the first helical structure 412. Because of the twisting nature of the first helical structure 412, the lights waves at the beam axis 402 cancel each other. When projected onto a flat surface (e.g., the receiving element placed perpendicular to the beam axis 402), the intensity distribution (or "optical vortex") appears as a ring of light with a dark vortex core in the center. The dark cortex core (also referred to as a "singularity") corresponds to a region of low intensity.

The example of FIG. 4 includes a second helical structure 414 ("m=−1") that is also characterized by one rotation of phase around the beam axis 402. As shown in FIG. 4, the second helical structure 414 is based on an opposite rotational direction of the first helical structure 412. For example, the first optical phase distribution 432 indicates a clockwise rotation of the first helical structure 412 and a second optical phase distribution 434 corresponding to the second helical structure 414 indicates a counter-clockwise rotation of the second helical structure 414. A second intensity distribution 454 corresponding to the second helical structure 414 indicates a similar intensity distribution as the first intensity distribution 452.

The example of FIG. 4 also includes a third helical structure 416 ("m=0") that is characterized by zero rotations around the beam axis 402. That is, the third helical structure 416 indicates that the corresponding beam is not helical-shaped. As a result, the wavefronts associated with the third helical structure 416 are depicted as multiple disconnected surfaces, such as a sequence of parallel planes. As there is no "twist" or phase rotation associated with the third helical structure 416, a third optical phase distribution 436 corresponding to the third helical structure 416 indicates a same phase. Additionally, as there is not twist in the phase rotation associated with the third helical structure 416, a corresponding third intensity distribution 456 does not depict a singularity at the center since the light waves associated with the third helical structure 416 do not cancel each other out.

The example of FIG. 4 also includes a fourth helical structure 418 ("m=+2") and a fifth helical structure 420 ("m=−2"). The fourth helical structure 418 and the fifth helical structure 420 are characterized by two rotations around the beam axis 402. As shown in FIG. 4, the fifth helical structure 420 is based on an opposite rotational direction of the fourth helical structure 418. A fourth optical phase distribution 438 corresponding to the fourth helical structure 418 indicates that the fourth helical structure 418 is shaped as a double helical surface and completes two cycles (e.g., two completions of 0 to 2π or 4π) of phase rotation around the beam axis 402. Additionally, the singularity at a fourth intensity distribution 458 corresponding to the fourth helical structure 418 is larger than, for example, the first intensity distribution 452 as the additional "twists" associated with the fourth helical structure 418 provide additional light beams to cancel each other out, resulting in an increased low intensity region.

A fifth optical phase distribution 440 corresponding to the fifth helical structure 420 indicates that the fifth helical structure 420 is based on an opposite rotational direction of the fourth helical structure 418. For example, the fourth optical phase distribution 438 indicates two clockwise rotations of the fourth helical structure 418 and the fifth optical phase distribution 440 indicates two counter-clockwise rotations of phase of the fifth helical structure 420. A fifth intensity distribution 460 corresponding to the fifth helical structure 420 indicates a similar intensity distribution as the fourth intensity distribution 458.

The example of FIG. 4 also includes a sixth helical structure 422 ("m=+3") and a seventh helical structure 424 ("m=−3"). The sixth helical structure 422 and the seventh helical structure 424 are characterized by three rotations around the beam axis 402. As shown in FIG. 4, the seventh helical structure 424 is based on an opposite rotational direction of the sixth helical structure 422. A sixth optical phase distribution 442 corresponding to the sixth helical structure 422 indicates that the sixth helical structure 422 is shaped as a triple helical surface and completes three cycles (e.g., three completions of 0 to 2π or 6π) of phase rotation around the beam axis 402. Additionally, the singularity at a sixth intensity distribution 462 corresponding to the sixth helical structure 422 is larger than, for example, the first intensity distribution 452 as the additional "twists" associated with the sixth helical structure 422 provide additional light beams to cancel each other out, resulting in an increased low intensity region.

A seventh optical phase distribution 444 corresponding to the seventh helical structure 424 indicates that the seventh helical structure 424 is based on an opposite rotational direction of the sixth helical structure 422. For example, the sixth optical phase distribution 442 indicates three clockwise rotations of the sixth helical structure 422 and the seventh optical phase distribution 444 indicates three counter-clockwise rotations of phase of the seventh helical structure 424. A seventh intensity distribution 464 corresponding to the seventh helical structure 424 indicates a similar intensity distribution as the sixth intensity distribution 462.

OAM beams may be useful as a transmission scheme for line-of-sight transmissions in a wireless communication network, such as the access network 100 of FIG. 1. For example, OAM transmissions (also referred to as "OAM waveforms") may be useful for higher bands, such as the millimeter wave frequency band or higher frequency bands (e.g., FR2, FR4, etc.). When employing MIMO technology, each topological charge of an OAM transmission may correspond to an orthogonal carrier.

A helical structure for use in wireless communication may be generated using various techniques. As an example, FIG. 5A depicts an example 500 of an OAM transmission 503 transmitted by an OAM transmitter 502 and received by an OAM receiver 506. In some examples, the OAM transmitter 502 may include a component that is configured to generate a helical structure with a particular topological charge. In some examples, an optical element, such as a lens, may be employed to generate the desired helical structure. For example, a lens may be positioned and configured so that a beam output by the OAM transmitter 502 is shaped with a particular topological charge (e.g., m=+1, m=−1, etc.). In other examples, a lens may not be used.

An antenna array at a receiver (e.g., the OAM receiver 506) may receive the OAM transmission 503 output by the OAM transmitter 502. The OAM transmission 503 may comprise a beam axis 504, e.g., an axis of a beamformed signal. FIG. 5A depicts a vortex 510 that may correspond to the intensity distribution of the OAM transmission 503. The vortex 510 includes a singularity 512 (e.g., a central singularity) associated with a low intensity region.

The antenna array at the receiver may include a set of connected antenna elements. The antenna elements operate as the interface between radio waves and a transmitter and/or a receiver. The antenna elements of the antenna array may operate as a single antenna to transmit and/or receive transmissions. Thus, an antenna may correspond to an antenna element and/or an antenna array, while an antenna array may correspond to a set of connected antenna elements, as described in connection with FIGS. 6, 7, and/or 8. The OAM transmission 503 may be received at multiple antenna elements at the OAM receiver 506, such as a first antenna element 520 ("Antenna 1") and a second antenna element 522 ("Antenna 2"). In some examples, the first antenna element 520 and the second antenna element 522 may be part of a same antenna array. In some examples, the first antenna element 520 may be part of a first antenna array and the second antenna element 522 may be part of a second antenna array different than the first antenna array. For example, the first antenna array may be associated with a first transmit-receive point (TRP) and the second antenna array may be associated with a second TRP.

The OAM receiver 506 may compare the detected phases around the singularity 512 to determine the topological charge associated with the OAM transmission 503. For example, the OAM receiver 506 may measure the phase at the first antenna element 520 and the phase at the second antenna element 522 relative to the singularity 512 to determine the topological charge associated with the OAM transmission. In some examples, the OAM receiver 506 may apply Equation 2 below to determine whether the received OAM transmission is misaligned.

$$\frac{1}{2\pi}\int d\theta e^{im\theta}\left(e^{-im'\theta}\right) = \delta_{m,m'} \quad \text{Equation 2}$$

In Equation 2, the parameter "θ" represents the angle measured around the axis (e.g., the beam axis). The parameter "m" represents a topological charge and corresponds to a number of rotations that a helical structure (sometimes referred to as a "helical beam" or "helical wavefront") exhibits in a path circling once around the center of a receiver. The topological charge may comprise an integer and may be positive or negative depending on the direction in which the helical structure twists. The higher the value of the topological charge m, the faster the phase of the wavefront rotates around a beam axis. As an example, for OAM for light, the wavefront rotates around a beam axis. For an example with a radio frequency OAM, the beam axis may refer to an axis of the RF signal beam. The parameter "$e^{im\theta}$" represents a received tested phase pattern. The parameter "$e^{-im'\theta}$" represents an actual received beam. When integrating over a continuous phase θ, the outcome "$\delta_{m,m'}$," represents whether the received beam is aligned or misaligned. For example, when the outcome $\delta_{m,m'}$ is equal to 1, the OAM receiver 506 may determine that the received signal is aligned, and when the outcome $\delta_{m,m'}$ is not equal to 1, then the OAM receiver 506 may determine that the received signal is misaligned.

In some examples, the number of antenna elements at which measurements are made may be based on the topological charge. For example, the receiver may use a number of antenna elements based on Equation 3 below.

Number of elements≥2|m|+1           Equation 3

In Equation 3, the number of elements is determined as at least one more than twice the absolute value of the topological charge. For example, to detect a topological charge of m=+1 or m=−1, the receiver may employ at least three antenna elements to measure the phase. However, in some examples, the number of elements may depend on the configuration of the elements at the OAM receiver 506.

FIG. 5B is a diagram 550 illustrating the OAM transmitter 502 in communication with the OAM receiver 506. Referring to FIG. 5B the OAM transmitter 502 may transmit a beamformed signal to the OAM receiver 506 in one or more directions 552a, 552b, 552c, 552d, 552e, 552f, 552g, 552h. The OAM receiver 506 may receive the beamformed signal from the OAM transmitter 502 in one or more receive directions 554a, 554b, 554c, 554d. The OAM receiver 506 may also transmit a beamformed signal to the OAM transmitter 502 in one or more of the directions 554a, 554b, 554c, 554d. The OAM transmitter 502 may receive the beamformed signal from the OAM receiver 506 in one or more of the receive directions 552a, 552b, 552c, 552d, 552e, 552f, 552g, 552h. The OAM transmitter 502/OAM receiver 506 may perform beam training to determine the best receive and transmit directions for each of the OAM transmitter 502/OAM receiver 506. The transmit and receive directions for the OAM transmitter 502 may or may not be the same. The transmit and receive directions for the OAM receiver 506 may or may not be the same.

A beam-pair link (BPL) refers to a transmit beam and receive beam pair. For example, a first BPL may include a transmit direction 552c and receive direction 554b pair, and a second BPL may include a transmit direction 554c and receive direction 552g pair.

In the examples of FIGS. 5A and 5B, the OAM transmitter 502 may be implemented by a base station, such as the base station 102/180, the base station 310, the UE 350, and/or an IAB device (e.g., a distributed unit (DU) node of the IAB device and/or a mobile termination (MT) node of the IAB device). Aspects of the OAM receiver 506 may be implemented by a UE, such the UE 104, the base station 310, the UE 350, and/or an IAB device (e.g., a distributed unit (DU) node of the IAB device and/or a mobile termination (MT) node of the IAB device).

A Butler Matrix is a circuit beamformer consisting of interconnected fixed phase shifters and 3 decibel (dB) hybrid couplers. The Butler Matrix may be used for providing (or "feeding") an antenna array with a constant phase difference between antenna elements. The Butler Matrix may also be referred to as a passive feeding N×N network with multiple beam steering capabilities for unified array antennas with N outputs connected to antenna elements and N inputs that represent N orthogonal beam ports. A Butler Matrix may be used for OAM waveforms due to its power efficiency when communicating multiple beams.

Figure 6:
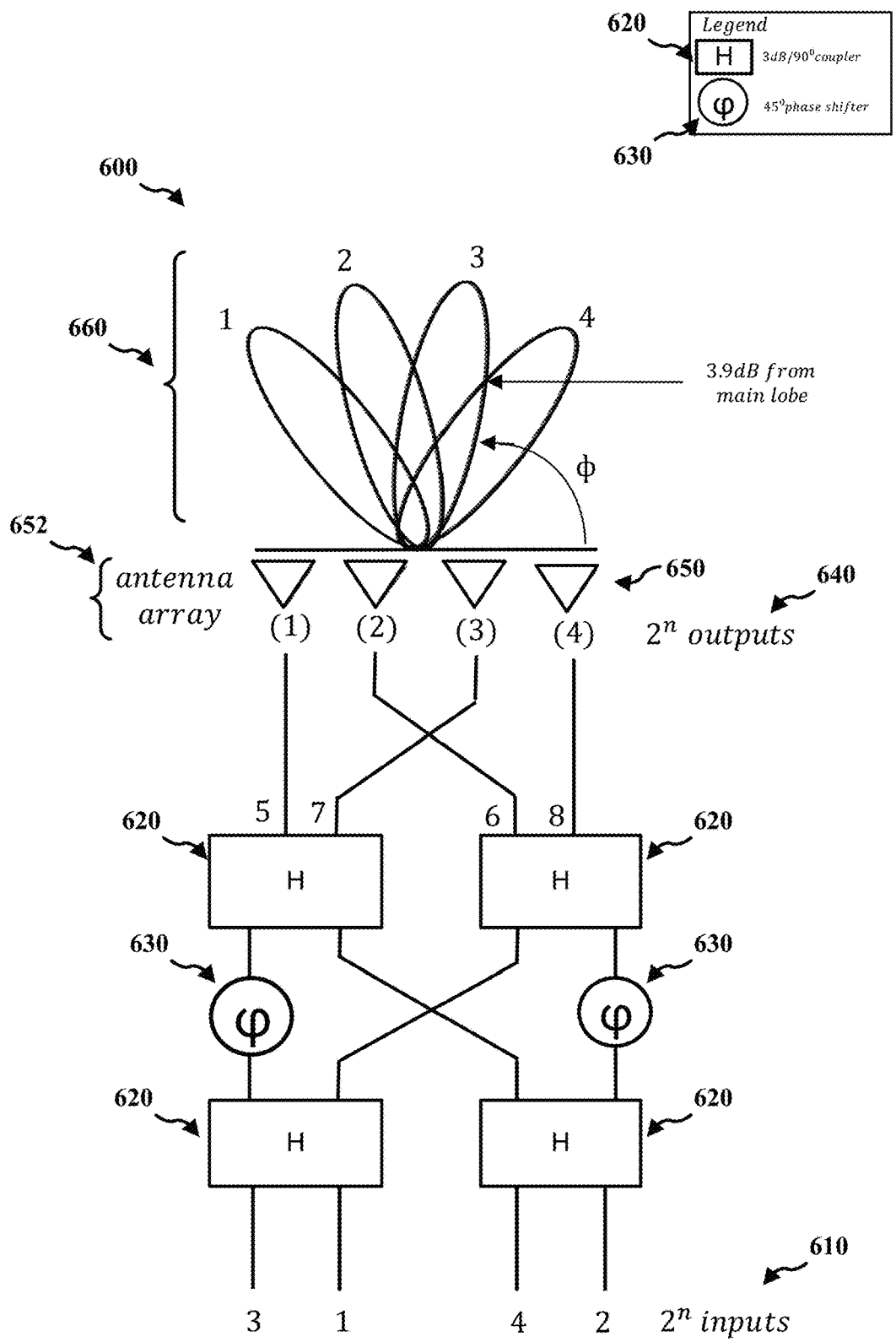
FIG. 6 depicts an example 4×4 Butler Matrix for a unified linear array, in accordance with various aspects of the present disclosure.

FIG. 6 depicts an example 4×4 Butler Matrix 600 for a uniform linear array 652, as presented herein. As shown in FIG. 6, the uniform linear array 652 includes a plurality of antenna elements 650. The antenna elements 650 of the uniform linear array 652 may be connected and operate as a single antenna to receive and/or transmit transmissions. In the illustrated example of FIG. 6, the Butler Matrix 600 includes four inputs 610 that are passed through a combination of four hybrid couplers 620 and two fixed phase shifters 630 to generate four outputs 640. The four outputs 640 are received by respective antenna elements 650 of a uniform linear array type antenna array (e.g., the uniform linear array 652) and generate four example beams 660. Each of the respective hybrid couplers 620 generate a 90-degree offset. Each of the respective fixed phase shifters 630 create a $\pi/4$ phase shift. As a result, the four example beams 660 are orthogonally spaced beams.

Figure 7:
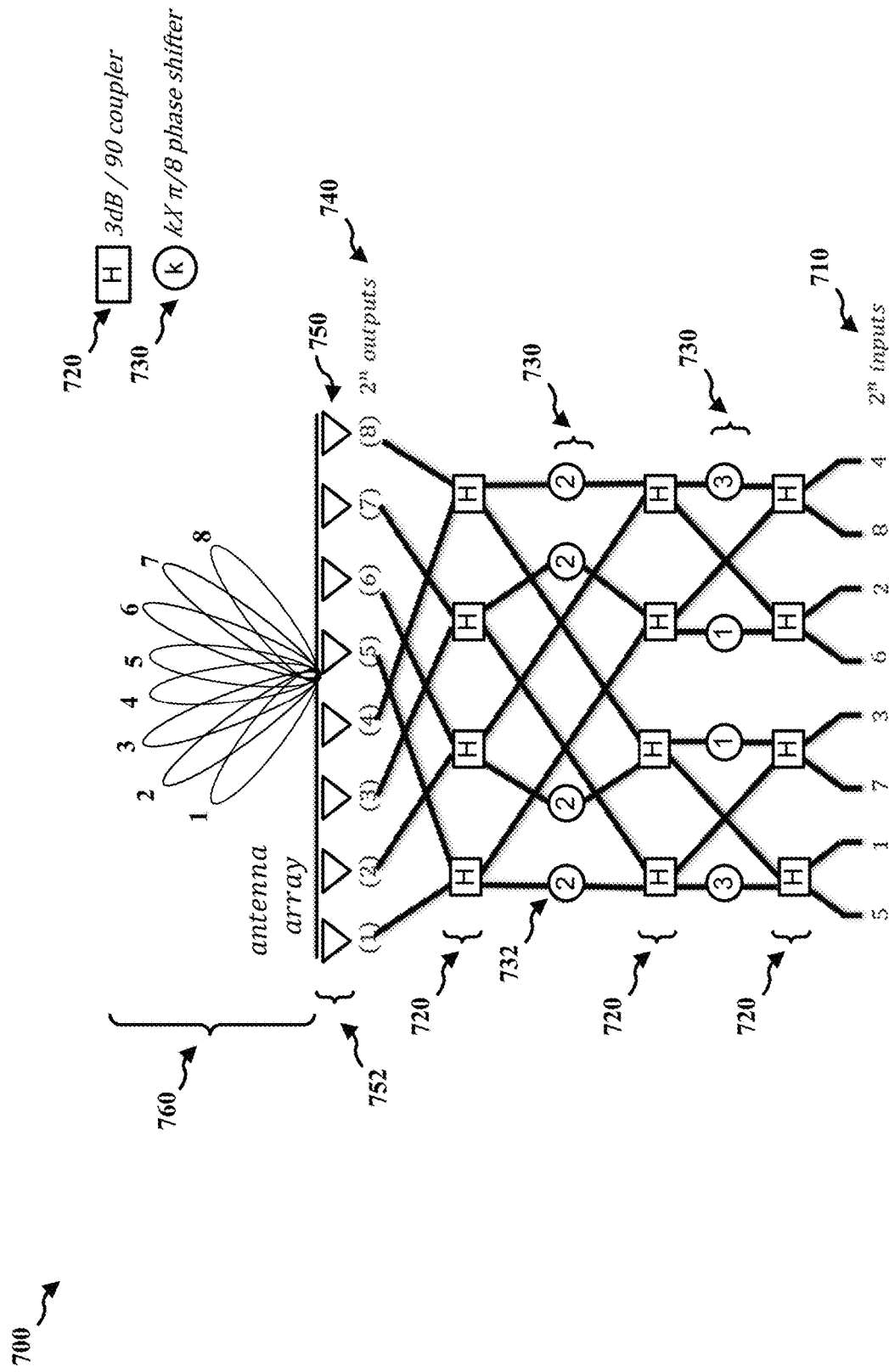
FIG. 7 depicts an example 8×8 Butler Matrix for a unified linear array, in accordance with various aspects of the present disclosure.

FIG. 7 depicts an example 8×8 Butler Matrix 700 for a uniform linear array 752, as presented herein. Similar to the example of FIG. 6, the uniform linear array 752 includes a plurality of antenna elements 750 that may be connected and operate as a single antenna to receive and/or transmit transmissions. In the illustrated example of FIG. 7, the Butler Matrix 700 includes eight inputs 710 that are passed through a combination of twelve hybrid couplers 720 and eight fixed phase shifters 730 to generate eight outputs 740. The outputs 740 are received by respective antenna elements 750 of a uniform linear array type antenna array (e.g., the uniform linear array 752) and generate eight example beams 760. Each of the respective hybrid couplers 720 generate a 90-degree offset. Each of the respective fixed phase shifters 730 create an integer multiplication of an index k of a $\pi/8$ phase shift. For example, an example fixed phase shifter 732 creates an integer multiplication of an index k=2 of a $\pi/8$ phase shift (or a $2*\pi/8=\pi/4$ phase shift). As a result, the eight example beams 760 are orthogonally spaced beams.

Figure 8:
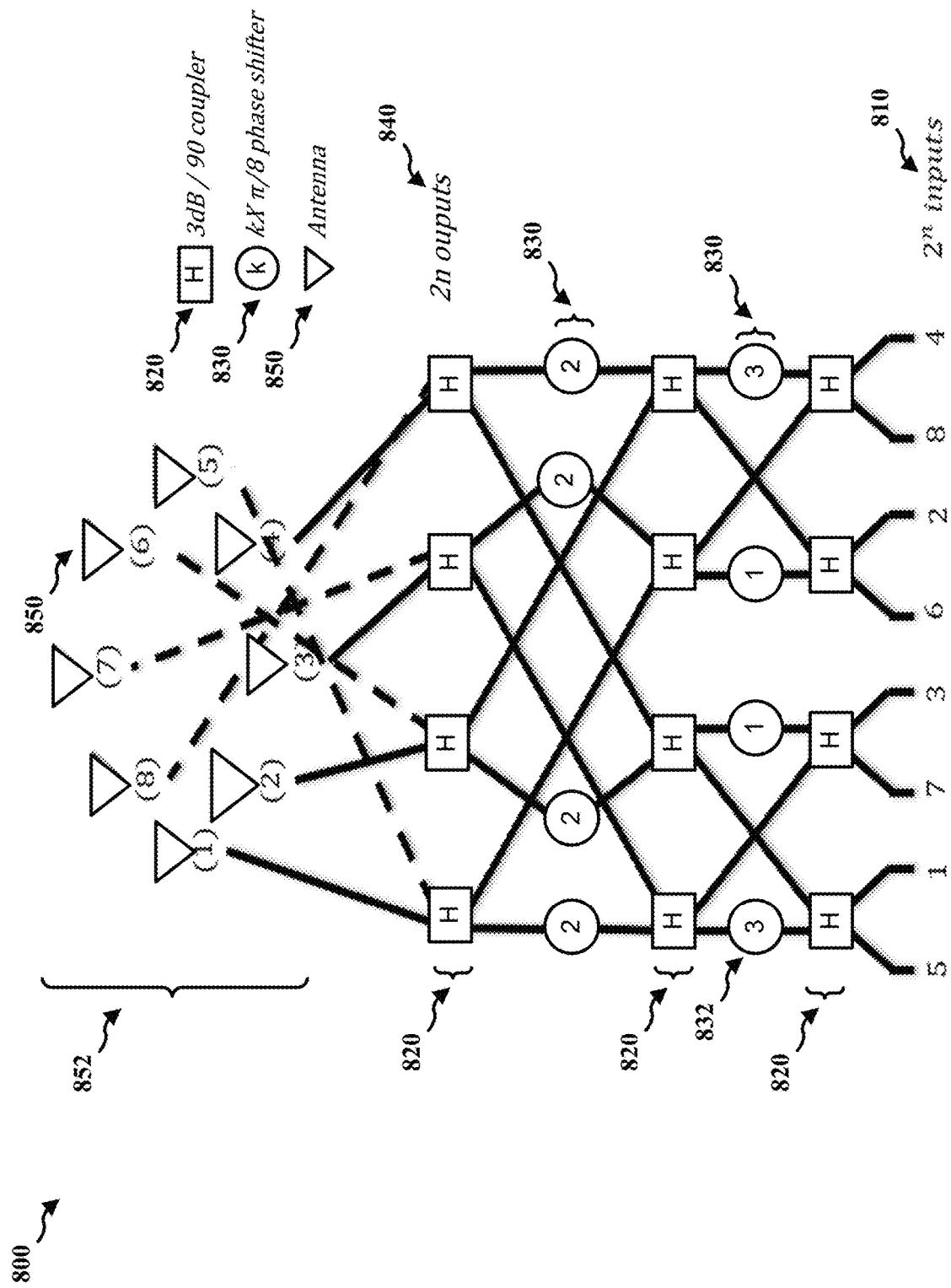
FIG. 8 depicts an example 8×8 Butler Matrix for a unified circular array, in accordance with various aspects of the present disclosure.

FIG. 8 depicts an example 8×8 Butler Matrix 800 for a uniform circular array 852, as presented herein. Similar to the examples of FIGS. 6 and 7, the uniform circular array 852 includes a plurality of antenna elements 850 that may be connected and operate as a single antenna to receive and/or transmit transmissions. Aspects of the 8×8 Butler Matrix 800 are similar to the 8×8 Butler Matrix 700 of FIG. 7. For example, the Butler Matrix 800 includes eight inputs 810 that are passed through a combination of twelve hybrid couplers 820 and eight fixed phase shifters 830 to generate eight outputs 840. The outputs 840 are received by respective antenna elements 850 to generate eight example beams. Each of the respective hybrid couplers 820 generate a 90-degree offset. Each of the respective fixed phase shifters 830 create an integer multiplication of an index k of a $\pi/8$ phase shift. For example, an example fixed phase shifter 832 creates an integer multiplication of an index k=3 of a $\pi/8$ phase shift (or a $3*\pi/8$ phase shift). As a result, the eight example beams generated by the Butler Matrix 800 are orthogonally spaced beams.

However, while the antenna elements 750 of the Butler Matrix 700 are arranged in a uniform linear array, the antenna elements 850 of the Butler Matrix 800 are arranged in a uniform circular array.

Aspects disclosed herein provide a framework to facilitate a wireless communication device to indicate whether the wireless communication device has the capability to communicate using OAM transmissions. For example, aspects presented herein provide for a first wireless communication device to transmit OAM capability information to a second wireless communication device. Based on the OAM capability information, the first wireless communication device and the second wireless communication device may communicate using OAM transmissions or non-OAM transmissions (e.g., signals on which OAM is not applied).

The first wireless communication device may transmit the OAM capability information after establishing a connection with the second wireless communication device. The OAM capability information may include one or more parameters that indicate OAM capabilities of the first wireless communication device.

Figure 9:
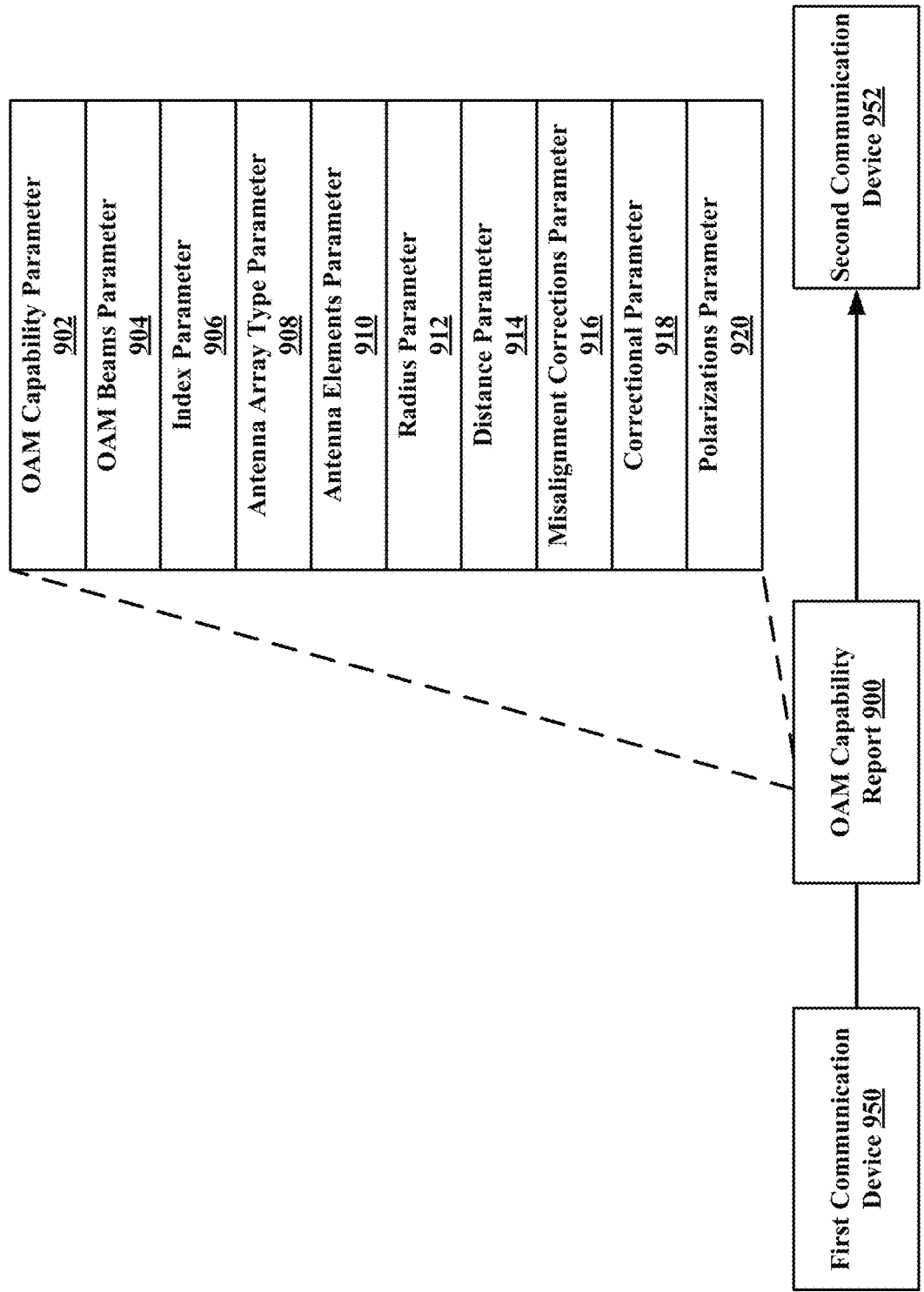
FIG. 9 depicts an example OAM capability report, in accordance with various aspects of the present disclosure.

FIG. 9 illustrates an example OAM capability report 900 that indicates the OAM capabilities of a first communication device 950 (e.g., a transmitting device) to a second communication device 952 (e.g., a receiving device).

In the illustrated example, the OAM capability report 900 includes an OAM capability parameter 902. The example OAM capability parameter 902 may indicate whether the first communication device 950 has the capability to receive and separate different OAM beams. For example, the OAM capability parameter 902 may comprise a first value indicating that the first communication device 950 has the capability to receive and separate different OAM beams and may comprise a second value indicating an incapability to (e.g., does not have the capability to) receive and separate different OAM beams. When the OAM capability parameter 902 indicates an incapability to receive and separate different OAM beams, the second communication device 952 may use non-OAM transmissions to communicate with the first communication device 950.

The OAM capability report 900 of FIG. 9 includes an OAM beams parameter 904. The example OAM beams parameter 904 may indicate a quantity of OAM beams that the first communication device 950 supports. For example, the OAM beams parameter 904 may indicate a quantity of layers that the first communication device 950 has the capability to receive and/or transmit. In some examples, the OAM beams parameter 904 may indicate a highest OAM beam supported. For example, the first communication device 950 may have the capability to support OAM beams of m=0, −1, and +1. In some such examples, the OAM beams parameter 904 may indicate that the first communication device 950 supports OAM beam index m=+1. The second communication device 952 may determine, based on the indicated OAM beam index that the first communication device 950 supports the OAM beam index m=+1, the opposite spin OAM beam (e.g., OAM beam index m=−1), and the OAM beam index m=0.

The OAM capability report 900 of FIG. 9 includes an index parameter 906. The example index parameter 906 may indicate an index for each of one or more OAM beams that the first communication device supports 950. For example, the first communication device 950 may have the capability to support OAM beams of m=0, −1, and +1. In some such examples, the OAM beams parameter 904 may include the indices of the supported OAM beams (e.g., the OAM beam indexes −1, 0, and +1). In some examples, the index parameter 906 may include a value that maps to one or more OAM beam indices. For example, the index parameter 906 may include a number of antenna elements that the first communication device 950 comprises for receiving OAM beams. The second communication device 952 may map the value of the index parameter 906 to one or more OAM beam indices.

FIG. 10 depicts an example table 1000 that facilitates mapping a value of the index parameter 906 to one or more OAM beam indices. As shown in FIG. 10, the table 1000 includes a first column 1002 indicating a value transmit by a first communication device (e.g., the first communication device 950 of FIG. 9). The example table 1000 also includes a second column 1004 indicating the one or more OAM beam indices that map to the corresponding value in the first column 1002.

In the illustrated example of FIG. 10, the table 1000 includes a first row 1010 including an index parameter value "1." As shown in FIG. 10, the index parameter value "1" maps to an OAM beam index m=0. Thus, if the first communication device supports one OAM beam index, the first communication device may transmit the index parameter value "1" in the index parameter 906 of the OAM capability report 900. The second communication device receiving the OAM capability report 900 may use the table 1000 to map the received index parameter value "1" to the OAM beam index m=0.

In the illustrated example of FIG. 10, the table 1000 includes a second row 1012 including an index parameter value "2-1." As shown in FIG. 10, the index parameter value "2-1" maps to two OAM beam indices (e.g., m=0, m=−1). For example, the second communication device receiving the OAM capability report 900 may use the table 1000 to map a received index parameter value "2-1" to the OAM beam indices m=0 and m=−1.

In the illustrated example of FIG. 10, the table 1000 includes a third row 1014 including an index parameter value "2-2." As shown in FIG. 10, the index parameter value "2-2" maps to two OAM beam indices (e.g., m=0, m=+1) that are different than the OAM beam indices indicated by the index parameter value "2-1" of the second row 1012. For example, the second communication device receiving the OAM capability report 900 may use the table 1000 to map a received index parameter value "2-2" to the OAM beam indices m=0 and m=+1.

In the illustrated example of FIG. 10, the table 1000 includes a fourth row 1016 including an index parameter value "3." As shown in FIG. 10, the index parameter value "3" maps to three OAM beam indices (e.g., m=0, m=−1, m=+1). For example, the second communication device receiving the OAM capability report 900 may use the table 1000 to map a received index parameter value "3" to the OAM beam indices m=0, m=−1, and m=+1.

In a similar manner, other combinations of OAM beam indices (as shown in the second column 1004) may be mapped to an index parameter value (as shown in the first column 1002).

In some examples, the index parameter value indicated in the first column 1002 may correspond to a quantity of antenna elements that the first communication device may use to receive OAM beams. For example, in the example first row 1010, the index parameter value may indicate that the first communication device includes one antenna element. In some such examples, it may be appreciated that the first communication device supports the OAM beam index m=0. In a similar manner, the example fourth row 1016 indicates that the first communication device includes three antenna elements, which maps to the OAM beam indices m=0, m=−1, and m=+1. However, when the index parameter value indicates that the first communication device includes an even quantity of antenna elements, it may be beneficial to indicate the direction of spin that the antenna elements support. For example, when the first communication device includes two digital chains, the first digital chain may correspond to the OAM beam index m=0, but the second digital chain may correspond to the OAM beam index m=−1 or the OAM beam index m=+1. A digital chain may correspond to the summation of an analog signal sampled by an analog-to-digital converter (ADC). The analog signal may be received by one antenna element or from multiple antenna elements. In some examples in which the analog signals are received from multiple antenna elements, the respective signals may have a phase pattern. In some examples, the phase pattern may be generated by a Butler matrix, such as the example Butler matrices of FIGS. 6, 7, and/or 8. A digital chain may be used to transmit a layer of data. Multiple digital streams can receive multiple layers. The number of digital streams may be the same or greater than the number of layers. Accordingly, as shown in the example second row 1012 and the example third row 1014 of the table 1000, different values may be used to indicate the direction of spin associated with the second antenna element. For example, the index parameter value "2-1" of the example second row 1012 maps the second antenna element to the OAM beam index m=−1 and the index parameter value "2-2" of the example third row 1014 maps the second antenna element to the OAM beam index m=+1.

Although the example index parameter values of the first column 1002 include one- or two-digit values, other examples may use alternative or additional dictionaries to map an index parameter value to one or more OAM beam indices. For example, the example first row 1010 may include an index parameter value "A" that may map to the OAM beam index m=0, the example second row 1012 may include an index parameter value "B" that may map to the OAM beam indices m=0, m=−1, etc.

Returning to the example of FIG. 9, the OAM capability report may include one or more antenna description parameters that indicate a physical description of the antenna array of the first communication device 950. For example, the OAM capability report 900 of FIG. 9 includes an antenna array type parameter 908, an antenna elements parameter 910, a radius parameter 912, and a distance parameter 914 that may correspond to the physical description of the antenna array of the first communication device 950. The example antenna array type parameter 908 may indicate a type of antenna array of the first communication device 950 for communicating using OAM beams. For example, the antenna array of the first communication device 950 may comprise a unified circular array (UCA), a unified rectangular array (URA), multiple UCAs, multiple URAs, etc. The example antenna elements parameter 910 may indicate a quantity of antenna elements of the antenna array of the first communication device 950. The example radius parameter 912 may indicate a radius associated with the antenna array. The example distance parameter 914 may indicate a distance between one or more antenna elements of the antenna array of the first communication device 950.

In some examples, reception of OAM transmissions may be sensitive to lateral shift misalignments between a transmitter and a receiver. For example, as the distance between the transmitter and the receiver increases, the displacement size and direction relative to the beam axis of the OAM transmission may have an increased effect on accurate reception of the OAM transmission. The misalignment may be due to aberrations in the medium over which the OAM transmission travels. In some examples, the misalignment may be due to changes in the physical locations of the transmitter and/or the receiver. For example, in a data center, a first wireless device (e.g., a server rack) may transmit an OAM transmission to a second wireless device. However, while operating, one or both of the wireless devices may be moved due to, for example, the operation of the wireless devices, due to vibrations in the floor, etc. Thus, it may be beneficial for the first communication device 950 to indicate to the second communication device 952 whether the first communication device 950 has the capability to perform beam steering for handling misalignment corrections.

The OAM capability report 900 of FIG. 9 includes a misalignment corrections parameter 916. The misalignment corrections parameter 916 may indicate whether the first communication device 950 has the capability to correct misalignment of OAM beams at the first communication device 950 (e.g., has the capability to perform beam steering) or the lack of capability to correct misalignment of OAM beams. In some examples, when the first communication device 950 has the capability to perform beam steering to handle misalignment corrections, the first communication device 950 may also include a correctional parameter 918. The example correctional parameter 918 may indicate a level of correction (or beam steering) that the first communication device 950 has the capability to perform. For example, the correctional parameter 918 may include a maximal correction in distance and/or per axis. For example, the maximal correction may indicate a distance (e.g., in millimeters) from the center of an array at the first communication device 950 that the first communication device 950 is able to correct. In some examples, the maximal correction may indicate a distance at the second communication device 952 for which the first communication device 950 has the capability to correct. For example, the distance at the second communication device 952 may be a predefined or preconfigured distance, such as one meter. In some examples, when the first communication device 950 lacks the capability to perform beam steering to handle misalignment corrections (e.g., as indicated by the misalignment corrections parameter 916), the second communication device 952 may determine to use non-OAM transmissions to communicate with the first communication device 950.

The OAM capability report 900 of FIG. 9 includes a polarizations parameter 920. The example polarizations parameter 920 indicates a quantity of polarization supported by the first communication device 950. For example, the polarizations parameter 920 may indicate whether the first communication device 950 supports one layer, two layers, etc. In some examples, the polarizations parameter 920 may additionally or alternatively indicate a type of polarization supported by the first communication device 950. For example, the polarizations parameter 920 may indicate whether the first communication device 950 supports circular polarization, linear polarization, etc. In some examples, the polarizations parameter 920 may indicate a quantity of polarizations supported per OAM beam index and/or a type of polarization supported per OAM beam index. For example, the polarizations parameter 920 may indicate that the first communication device 950 supports one layer and circular polarization for the OAM beam index m=0, supports two layers and circular polarization for the OAM beam index m=−1, supports one layer and linear polarization for the OAM beam index m=+1, etc.

Although the OAM capability report 900 of FIG. 9 includes a plurality of parameters, in other examples, the OAM capability report 900 may include one or more of the parameters included in the OAM capability report 900. For example, the OAM capability report 900 may include the OAM capability parameter 902 and one or more of the OAM beams parameter 904 and the index parameter 906. In some examples, the OAM capability report 900 may include the OAM capability parameter 902, at least one of the OAM beams parameter 904 or the index parameter 906, and one or more of the antenna array type parameter 908, the antenna elements parameter 910, the radius parameter 912, the distance parameter 914, the misalignment corrections parameter 916, the correctional parameter 918, and the polarizations parameter 920.

In some examples, the first communication device 950 may include a subset of the parameters in the OAM capability report 900 and include one or more additional parameters in a second transmission to the second communication device. For example, the first communication device 950 may include the OAM capability parameter 902 and at least one of the OAM beams parameter 904 or the index parameter 906 in the OAM capability report 900 and may include one or more of the antenna array type parameter 908, the antenna elements parameter 910, the radius parameter 912, the distance parameter 914, the misalignment corrections parameter 916, the correctional parameter 918, and the polarizations parameter 920 in a subsequent transmission to the second communication device.

Figure 11:
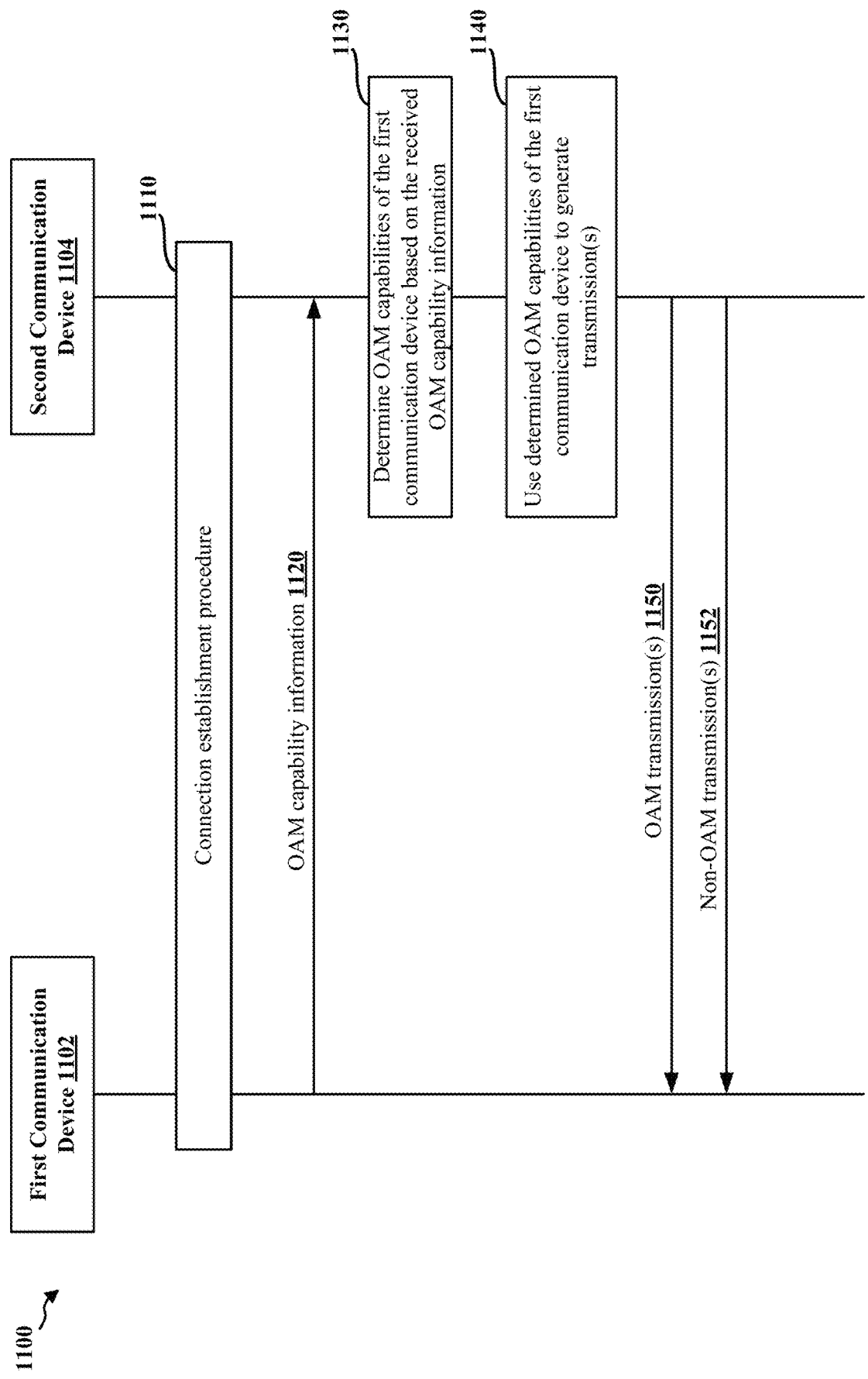
FIG. 11 is an example communication flow between a first communication device and a second communication device, in accordance with the teachings disclosed herein.

FIG. 11 illustrates an example communication flow 1100 between a first communication device 1102 and a second communication device 1104, as presented herein. In the illustrated example, the communication flow 1100 facilitates the first communication device 1102 indicating a capability or inability of the first communication device 1102 to receive OAM transmissions.

Although not shown in the illustrated example of FIG. 11, it may be appreciated that in additional or alternative examples, the first communication device 1102 and/or the second communication device 1104 may be in communication with one or more other communication devices.

Aspects of the communication devices 1102, 1104 may be implemented by the UE 104 of FIG. 1, the UE 350 of FIG. 3, the base station 102/180 of FIG. 1, and/or the base station 310 of FIG. 3. For example, in some examples, the communication between the first communication device 1102 and the second communication device 1104 may comprise a downlink transmission. In some such examples, the first communication device 1102 may comprise a UE and the second communication device 1104 may comprise a base station. In some examples, the communication between the first communication device 1102 and the second communication device 1104 may comprise an uplink transmission. In some such examples, the second communication device 1104 may comprise a UE and the first communication device 1102 may comprise a base station. In some examples, the communication between the first communication device 1102 and the second communication device 1104 may comprise a sidelink transmission. In some such examples, the first communication device 1102 may comprise a first sidelink device and the second communication device 1104 may comprise a second sidelink device (e.g., the first communication device 1102 and the second communication device 1104 may both be UEs). In some examples, at least one of the first communication device 1102 or the second communication device 1104 may comprise a relay node, such as an IAB node. For example, the other communication device may be a parent node, a child node, a UE, a base station, etc.

In the illustrated example, the first communication device 1102 and the second communication device 1104 performs a connection establishment procedure 1110. The communication devices 1102, 1104 may perform the connection establishment procedure 1110 to establish a connection and/or re-establish a connection. In some examples, the connection establishment procedure 1110 may comprise performing a random access channel (RACH) procedure in which the first communication device 1102 and the second communication device 1104 exchange one or more messages to establish the connection.

The first communication device 1102 transmits OAM capability information 1120 that is received by the second communication device 1104. The first communication device 1102 may transmit the OAM capability information 1120 using RRC signaling. In some examples, the first communication device 1102 may transmit the OAM capability information 1120 using a control channel and/or via a medium access control (MAC) control element (MAC-CE).

The OAM capability information 1120 may include information relating to the OAM capabilities of the first communication device. Aspects of the OAM capability information 1120 may be implemented by the OAM capability report 900 of FIG. 9. In some examples, the OAM capability information 1120 may include one or more of the parameters of the OAM capability report 900. For example, the OAM capability information 1120 may include one or more of the OAM capability parameter 902, the OAM beams parameter 904, the index parameter 906, the antenna array type parameter 908, the antenna elements parameter 910, the radius parameter 912, the distance parameter 914, the misalignment corrections parameter 916, the correctional parameter 918, and/or the polarizations parameter 920.

Although the example of FIG. 11 depicts one transmission from the first communication device 1102 to the second communication device 1104 for transmitting the OAM capability information 1120, in other examples, the first communication device 1102 may transmit the OAM capability information 1120 using any quantity of transmissions. For example, the first communication device 1102 may transmit a first subset of the OAM-related parameters of the OAM capability report 900 in a first transmission and a second subset of the OAM-related parameters of the OAM capability report 900 in a second transmission.

Additionally, although the example of FIG. 11 depicts the first communication device 1102 transmitting the OAM capability information 1120 to the second communication device 1104 after performing the connection establishment procedure 1110, in other examples, performing the connection establishment procedure 1110 may include the first communication device 1102 transmitting the OAM capability information 1120 to the second communication device 1104.

At 1130, the second communication device 1104 may determine the OAM capabilities of the first communication device 1102. The second communication device 1104 may use the OAM capability information 1120 to determine the OAM capabilities of the first communication device 1102. For example, based on the OAM capability information 1120, the second communication device 1104 may determine the OAM capabilities of the first communication device 1102. For example, based on the OAM capability parameter 902, the second communication device 1104 may determine whether the first communication device 1102 has the capability to receive and separate different OAM beams or lacks the capability to receive and separate different OAM beams. The second communication device 1104 may use the OAM beams parameter 904 to determine a quantity of OAM beams that the first communication device 1102 supports. The second communication device 1104 may use the index parameter 906 to determine an index for each of one or more OAM beams that the first communication device 1102 supports. The second communication device 1104 may use the antenna array type parameter 908 to determine a type of antenna array at the first communication device 1102. The second communication device 1104 may use the antenna elements parameter 910 to determine a quantity of antenna elements at the first communication device 1102. The second communication device 1104 may use the radius parameter 912 to determine a radius associated with the antenna array of the first communication device 1102. The second communication device 1104 may use the distance parameter 914 to determine a distance between one or more antenna elements of the antenna array. The second communication device 1104 may use the misalignment corrections parameter 916 to determine whether the first communication device 1102 has the capability to perform beam steering for handling misalignment corrections. The second communication device 1104 may use the correctional parameter 918 to determine a level of correction (or beam steering) that the first communication device 950 has the capability to perform. For example, the correctional parameter 918 may include a maximal correction in distance (e.g., in millimeters) and/or per axis. The second communication device 1104 may use the polarizations parameter 920 to determine a quantity of polarizations supported by the first communication device 1102, a type of polarization supported by the first communication device 1102, a quantity of polarizations supported per OAM beam index by the first communication device 1102, and/or a type of polarization supported per OAM beam index by the first communication device 1102.

At 1140, the second communication device 1104 uses the determined OAM capabilities of the first communication device to generate transmission(s) to the first communication device 1102. For example, the second communication device 1104 may generate OAM transmission(s) 1150 or non-OAM transmission(s) 1152 for transmitting to the first communication device based on the OAM capabilities indicated by the first communication device 1102.

The second communication device 1104 may generate the OAM transmission(s) 1150 when the OAM capability information 1120 indicates that the first communication device 1102 has the capability to receive and separate different OAM beams (e.g., as described in connection with the OAM capability parameter 902). The second communication device 1104 may use the additional parameters to determine characteristics of the OAM transmission(s) 1150. For example, the second communication device 1104 may use the OAM beams parameter 904 and/or the index parameter 906 to determine which one or more OAM beam indices to use for transmitting the OAM transmission(s) 1150 to the first communication device 1102, may use the antenna array type parameter 908, the antenna elements parameter 910, the radius parameter 912, and/or the distance parameter 914 to determine how to align the OAM transmission(s) 1150 with the first communication device 1102, and/or may use the polarizations parameter 920 to determine how many layers and/or types of polarizations to use when transmitting the OAM transmission(s) 1150 to the first communication device 1102.

In some examples, the second communication device 1104 may generate the non-OAM transmission(s) 1152 when the OAM capability information 1120 indicates an incapability to receive and separate different OAM beams at the first communication device 1102 (e.g., as described in connection with the OAM capability parameter 902). In some examples, the second communication device 1104 may generate the non-OAM transmission(s) 1152 when the OAM capability information 1120 indicates a lack of capability to perform beam steering for handling misalignment corrections at the first communication device 1102 (e.g., as described in connection with the misalignment corrections parameter 916).

Figure 12:
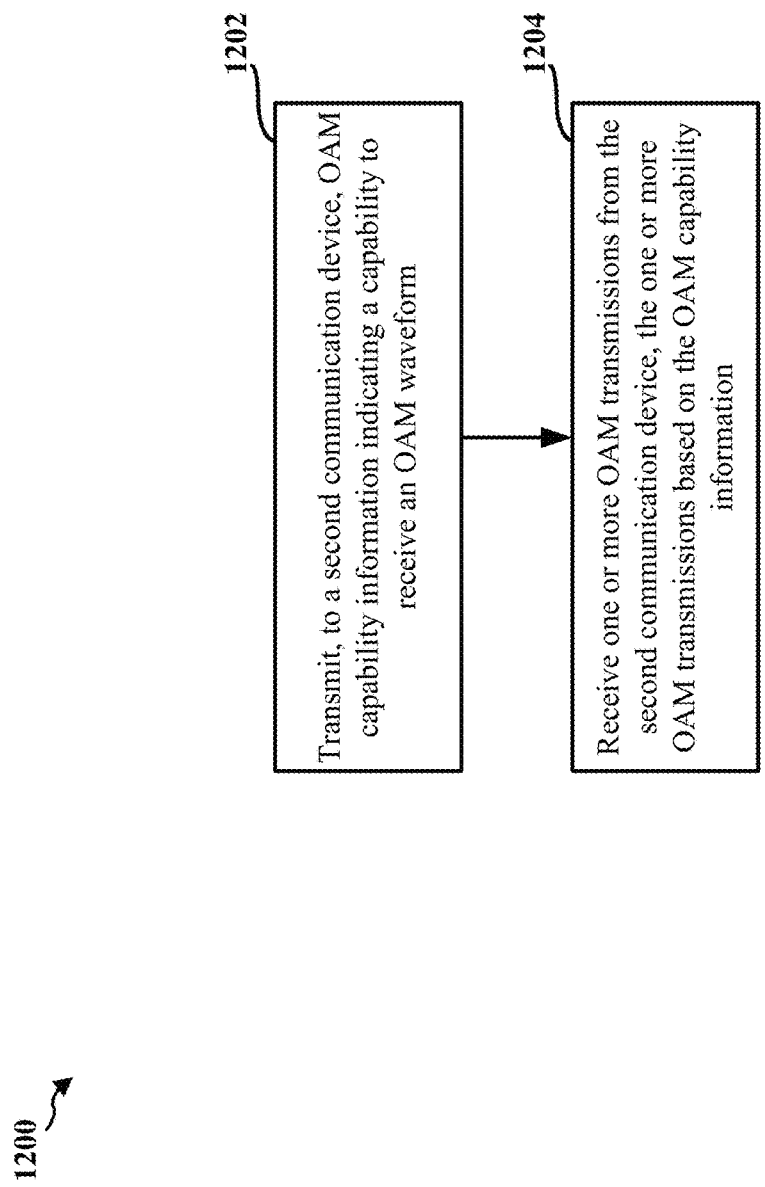
FIG. 12 is a flowchart of a method of wireless communication at a first communication device, in accordance with the teachings disclosed herein.

FIG. 12 is a flowchart 1200 of a method of wireless communication. The method may be performed by a first communication device (e.g., the UE 104, the UE 350, the first communication device 950, the first communication device 1102, and/or an apparatus 1402 of FIG. 14). The method may facilitate improving communication between a first communication device and a second communication by enabling the first communication device to signal support of communicating using OAM waveforms to the second communication device.

In some examples, the communication between the first communication device and the second communication device may comprise a downlink transmission. In some such examples, the first communication device may comprise a UE and the second communication device may comprise a base station. In some examples, the communication between the first communication device and the second communication device may comprise an uplink transmission. In some such examples, the second communication device may comprise a UE and the first communication device may comprise a base station. In some examples, the communication between the first communication device and the second communication device may comprise a sidelink transmission. In some such examples, the first communication device may comprise a first sidelink device and the second communication device may comprise a second sidelink device. In some examples, at least one of the first communication device or the second communication device may comprise a relay node, such as an IAB node.

At 1202, the first communication device transmits, to a second communication device, OAM capability information indicating a capability to receive an OAM waveform, as described in connection with the OAM capability information 1120 of FIG. 11. For example, 1202 may be performed by a capabilities component 1440 of the apparatus 1402 of FIG. 14.

At 1204, the first communication device receives one or more OAM transmissions from the second communication device, as described in connection with the OAM transmission(s) 1150 of FIG. 11. For example, 1204 may be performed by an OAM transmission reception component 1442 of the apparatus 1402 of FIG. 14.

In some examples, the OAM capability information may comprise an OAM capability parameter indicating that the first communication device has the capability to receive and separate different OAM beams, as described in connection with the OAM capability parameter 902 of FIG. 9.

In some examples, the OAM capability information may comprise an OAM beams parameter indicating a quantity of OAM beams that the first communication device supports, as described in connection with the OAM beams parameter 904 of FIG. 9.

In some examples, the OAM capability information may comprise an index parameter indicating an index for each of one or more OAM beams that the first communication device supports, as described in connection with the index parameter 906 of FIG. 9 and/or the table 1000 of FIG. 10.

In some examples, the OAM capability information may comprise one or more of: an antenna array type parameter indicating a type of antenna array of the first communication device for communicating using OAM waveforms (e.g., as described in connection with the antenna array type parameter 908 of FIG. 9), an antenna elements parameter indicating a quantity of antenna elements of the antenna array (e.g., as described in connection with the antenna elements parameter 910 of FIG. 9), a radius parameter indicating a radius associated with the antenna array (e.g., as described in connection with the radius parameter 912 of FIG. 9), or a distance parameter indicating a distance between one or more antenna elements of the antenna array (e.g., as described in connection with the distance parameter 914 of FIG. 9).

In some examples, the OAM capability information may comprise a misalignment corrections parameter indicating that the first communication device has the capability to correct misalignment of OAM waveforms at the first communication device, as described in connection with the misalignment corrections parameter 916 of FIG. 9. In some such examples, the OAM capability information may further include correctional parameters indicating a maximal correction in distance and per axis, as described in connection with the correctional parameter 918 of FIG. 9.

In some examples, the OAM capability information may comprise a misalignment corrections parameter indicating an incapability to correct misalignment of OAM waveforms at the first communication device.

In some examples, the OAM capability information may comprise a polarizations parameter indicating a quantity of polarizations supported by the first communication device, as described in connection with the polarizations parameter 920 of FIG. 9. In some examples, the polarizations parameter may indicate a type of polarizations supported by the first communication device. In some examples, the polarizations parameter may indicate the quantity of polarizations supported per OAM index. In some examples, the polarizations parameter may indicate a type of polarization supported per OAM index.

In some examples, the OAM capability information may comprise an OAM capability parameter indicating that the first communication device has the capability to receive and separate different OAM beams, and at least one of: an OAM beams parameter indicating a quantity of OAM beams that the first communication device supports, or an index parameter indicating an index for each of one or more OAM beams that the first communication device supports.

Figure 13:
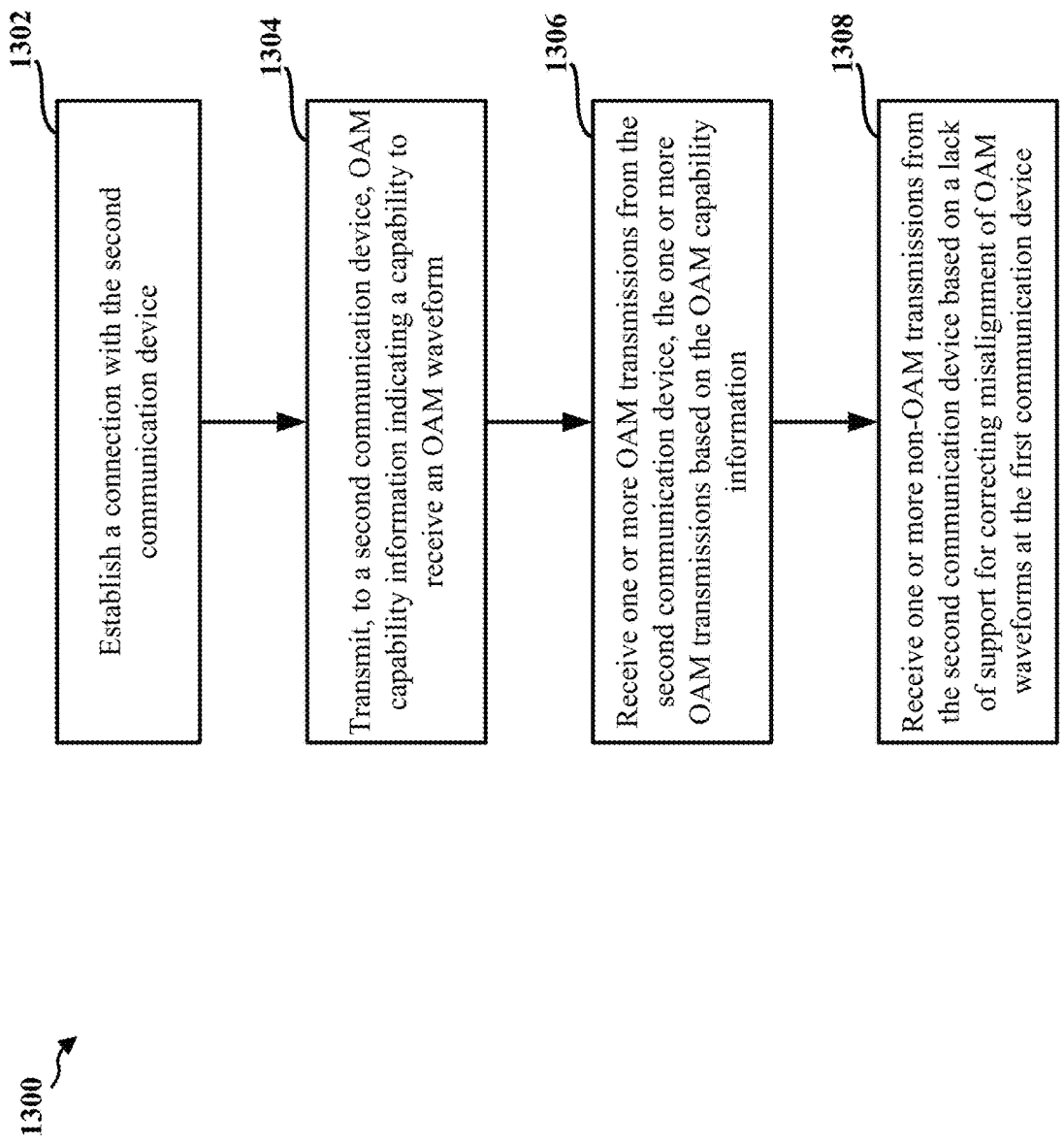
FIG. 13 is a flowchart of a method of wireless communication at a first communication device, in accordance with the teachings disclosed herein.

FIG. 13 is a flowchart 1300 of a method of wireless communication. The method may be performed by a first communication device (e.g., the UE 104, the UE 350, the first communication device 950, the first communication device 1102, and/or an apparatus 1402 of FIG. 14). The method may facilitate improving communication between a first communication device and a second communication by enabling the first communication device to signal support of communicating using OAM waveforms to the second communication device.

In some examples, the communication between the first communication device and the second communication device may comprise a downlink transmission. In some such examples, the first communication device may comprise a UE and the second communication device may comprise a base station. In some examples, the communication between the first communication device and the second communication device may comprise an uplink transmission. In some such examples, the second communication device may comprise a UE and the first communication device may comprise a base station. In some examples, the communication between the first communication device and the second communication device may comprise a sidelink transmission. In some such examples, the first communication device may comprise a first sidelink device and the second communication device may comprise a second sidelink device. In some examples, at least one of the first communication device or the second communication device may comprise a relay node, such as an IAB node.

At 1304, the first communication device transmits, to a second communication device, OAM capability information indicating support for reception of an OAM waveform, as described in connection with the OAM capability information 1120 of FIG. 11. For example, 1304 may be performed by a capabilities component 1440 of the apparatus 1402 of FIG. 14.

At 1306, the first communication device receives one or more OAM transmissions from the second communication device, as described in connection with the OAM transmission(s) 1150 of FIG. 11. For example, 1306 may be performed by an OAM transmission reception component 1442 of the apparatus 1402 of FIG. 14.

In some examples, the OAM capability information may comprise an OAM capability parameter indicating that the first communication device has the capability to receive and separate different OAM beams, as described in connection with the OAM capability parameter 902 of FIG. 9.

In some examples, the OAM capability information may comprise an OAM beams parameter indicating a quantity of OAM beams that the first communication device supports, as described in connection with the OAM beams parameter 904 of FIG. 9.

In some examples, the OAM capability information may comprise an index parameter indicating an index for each of one or more OAM beams that the first communication device supports, as described in connection with the index parameter 906 of FIG. 9 and/or the table 1000 of FIG. 10.

In some examples, the OAM capability information may comprise one or more of: an antenna array type parameter indicating a type of antenna array of the first communication device for communicating using OAM waveforms (e.g., as described in connection with the antenna array type parameter 908 of FIG. 9), an antenna elements parameter indicating a quantity of antenna elements of the antenna array (e.g., as described in connection with the antenna elements parameter 910 of FIG. 9), a radius parameter indicating a radius associated with the antenna array (e.g., as described in connection with the radius parameter 912 of FIG. 9), or a distance parameter indicating a distance between one or more antenna elements of the antenna array (e.g., as described in connection with the distance parameter 914 of FIG. 9).

In some examples, the OAM capability information may comprise a misalignment corrections parameter indicating that the first communication device has the capability to correct misalignment of OAM waveforms at the first communication device, as described in connection with the misalignment corrections parameter 916 of FIG. 9. In some such examples, the OAM capability information may further include correctional parameters indicating a maximal correction in distance and per axis, as described in connection with the correctional parameter 918 of FIG. 9.

In some examples, the OAM capability information may comprise a misalignment corrections parameter indicating an incapability to correct misalignment of OAM waveforms at the first communication device. In some such examples, at 1308, the first communication device may receive one or more non-OAM transmissions from the second communication device based on a lack of support for correcting misalignment of OAM waveforms at the first communication device, as described in connection with the non-OAM transmission(s) 1152 of FIG. 11. For example, 1308 may be performed by a non-OAM transmission reception component 1444 of the apparatus 1402 of FIG. 14.

In some examples, the OAM capability information may comprise a polarizations parameter indicating a quantity of polarizations supported by the first communication device, as described in connection with the polarizations parameter 920 of FIG. 9. In some examples, the polarizations parameter may indicate a type of polarizations supported by the first communication device. In some examples, the polarizations parameter may indicate the quantity of polarizations supported per OAM index. In some examples, the polarizations parameter may indicate a type of polarization supported per OAM index.

In some examples, the OAM capability information may comprise an OAM capability parameter indicating that the first communication device has the capability to receive and separate different OAM beams, and at least one of: an OAM beams parameter indicating a quantity of OAM beams that the first communication device supports, or an index parameter indicating an index for each of one or more OAM beams that the first communication device supports.

In some examples, at 1302, the first communication device may establish a connection with the second communication device, as described in connection with the connection establishment procedure 1110 of FIG. 11. For example, 1302 may be performed by a connection establishment component 1446 of the apparatus 1402 of FIG. 14. In some examples, the first communication device may transmit the OAM capability information to the second communication device (e.g., at 1304) after establishing the connection with the second communication device.

Figure 14:
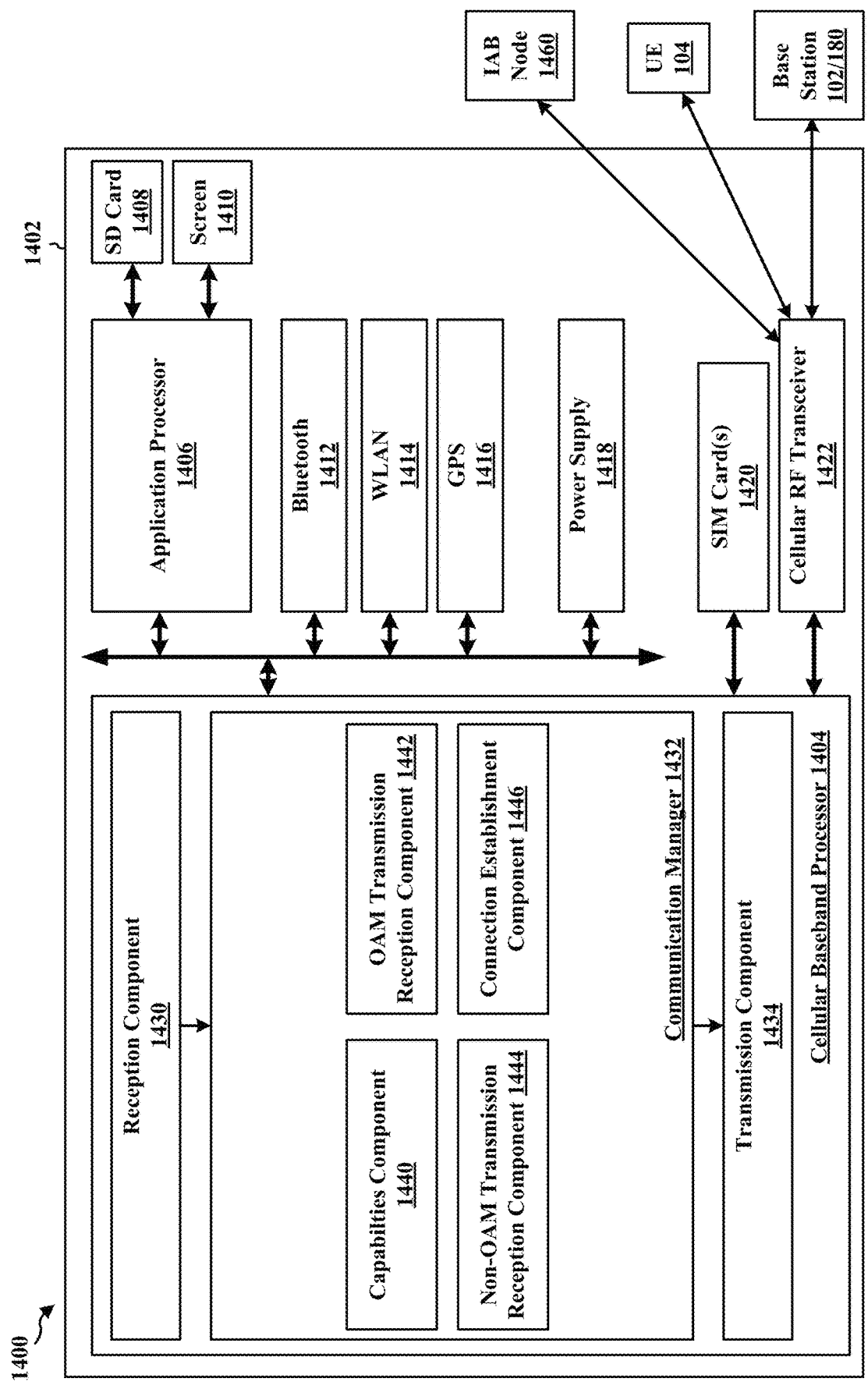
FIG. 14 is a diagram illustrating an example of a hardware implementation for an example apparatus, in accordance with the teachings disclosed herein.

FIG. 14 is a diagram 1400 illustrating an example of a hardware implementation for an apparatus 1402 that is configured to perform the aspects described in connection with FIGS. 12 and/or 13. In some examples, the apparatus 1402 may be a UE. In other examples, the apparatus 1402 may be a base station. In other examples, the apparatus 1402 may be a relay node, such as an IAB node. The apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104, the base station 102/180, and/or an IAB node 1460. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the cellular baseband processor 1404, and in another configuration, the apparatus 1402 may be the entire UE (e.g., see the UE 350 of FIG. 3) and include the additional modules of the apparatus 1402.

The communication manager 1432 includes a capabilities component 1440 that is configured to transmit, to a second communication device, OAM capability information indicating a capability to receive an OAM waveform, for example, as described in connection with 1202 of FIG. 12 and/or 1304 of FIG. 13.

The communication manager 1432 also includes an OAM transmission reception component 1442 that is configured to receive one or more OAM transmissions from the second communication device, for example, as described in connection with 1204 of FIG. 12 and/or 1306 of FIG. 13.

The communication manager 1432 also includes a non-OAM transmission reception component 1444 that is configured to receive one or more non-OAM transmissions from the second communication device based on a lack of support for correcting misalignment of OAM waveforms at the first communication device, for example, as described in connection with 1308 of FIG. 13.

The communication manager 1432 also includes a connection establishment component 1446 that is configured to establish a connection with the second communication, for example, as described in connection with 1302 of FIG. 13.

The apparatus may include additional components that perform each of the blocks of the algorithm in the flowcharts of FIGS. 12 and/or 13. As such, each block in the flowcharts of FIGS. 12 and/or 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for transmitting, to a second communication device, OAM capability information indicating support for reception of an OAM waveform. The example apparatus 1402 also includes means for receiving one or more OAM transmissions from the second communication device, the one or more OAM transmissions based on the OAM capability information.

In another configuration, the example apparatus 1402 also includes means for receiving one or more non-OAM transmissions from the second communication device based on a lack of support for correcting misalignment of OAM waveforms at the first communication device.

In another configuration, the example apparatus 1402 also includes means for establishing a connection with the second communication device.

The means may be one or more of the components of the apparatus 1402 configured to perform the functions recited by the means. As described supra, the apparatus 1402 may include the TX processor 368, the RX processor 356, and the controller/processor 359. As such, in one configuration, the means may be the TX processor 368, the RX processor 356, and the controller/processor 359 configured to perform the functions recited by the means.

Figure 15:
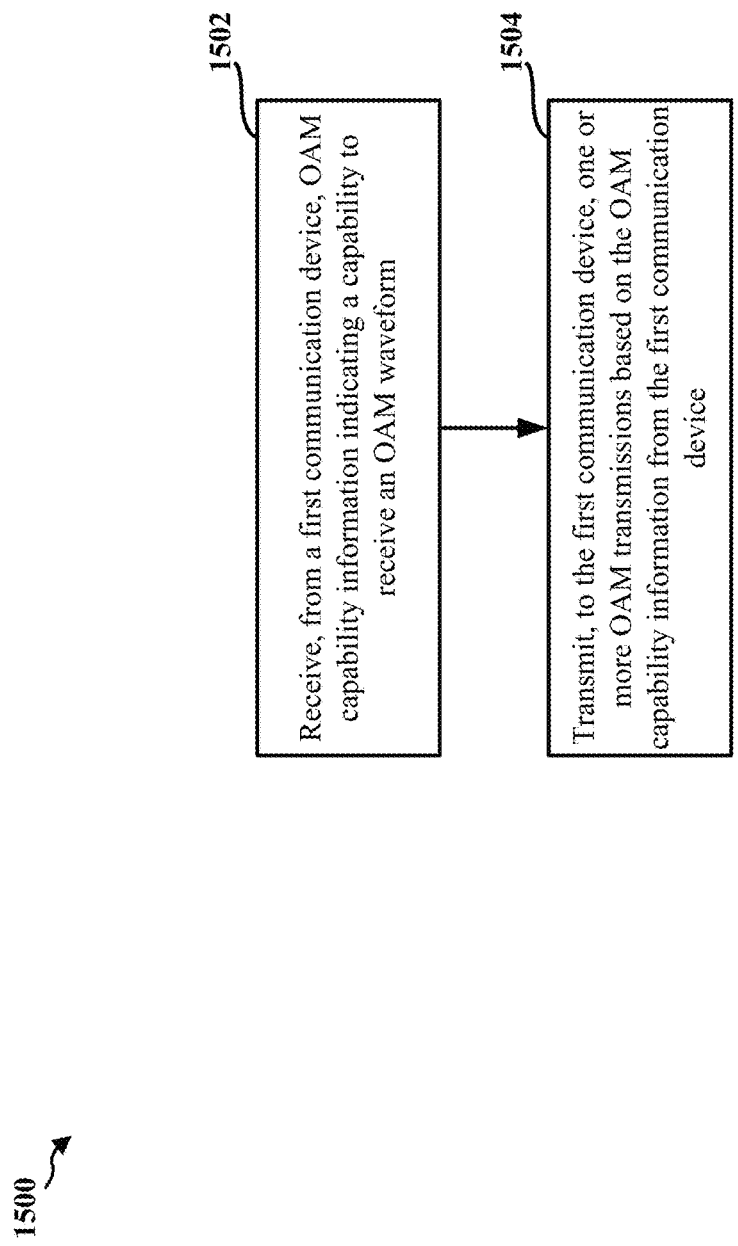
FIG. 15 is a flowchart of a method of wireless communication at a second communication device, in accordance with the teachings disclosed herein.

FIG. 15 is a flowchart 1500 of a method of wireless communication. The method may be performed by a second communication device (e.g., the base station 102/180, the base station 310, the second communication device 952, the second communication device 1104, and/or an apparatus 1702 of FIG. 17). The method may facilitate improving communication between a first communication device and a second communication by enabling the first communication device to signal support of communicating using OAM waveforms to the second communication device.

In some examples, the communication between the first communication device and the second communication device may comprise a downlink transmission. In some such examples, the first communication device may comprise a UE and the second communication device may comprise a base station. In some examples, the communication between the first communication device and the second communication device may comprise an uplink transmission. In some such examples, the second communication device may comprise a UE and the first communication device may comprise a base station. In some examples, the communication between the first communication device and the second communication device may comprise a sidelink transmission. In some such examples, the first communication device may comprise a first sidelink device and the second communication device may comprise a second sidelink device. In some examples, at least one of the first communication device or the second communication device may comprise a relay node, such as an IAB node.

At 1502, the second communication device receives, from a first communication device, OAM capability information indicating support for reception of an OAM waveform, as described in connection with the OAM capability information 1120 of FIG. 11. For example, 1502 may be performed by a capabilities component 1740 of the apparatus 1702 of FIG. 17.

At 1504, the second communication device transmits, to the first communication device, one or more OAM transmissions based on the OAM capability information from the first communication device, as described in connection with the OAM transmission(s) 1150 of FIG. 11. For example, 1504 may be performed by an OAM transmission component 1742 of the apparatus 1702 of FIG. 17.

In some examples, the OAM capability information may include an OAM capability parameter indicating that the first communication device has the capability to receive and separate different OAM beams, as described in connection with the OAM capability parameter 902 of FIG. 9.

In some examples, the OAM capability information may include an OAM beams parameter indicating a quantity of OAM beams that the first communication device supports, as described in connection with the OAM beams parameter 904 of FIG. 9.

In some examples, the OAM capability information may include an index parameter indicating an index for each of one or more OAM beams that the first communication device supports, as described in connection with the index parameter 906 of FIG. 9 and/or the table 1000 of FIG. 10.

In some examples, the OAM capability information may include array information including one or more of: an antenna array type parameter indicating a type of antenna array of the first communication device for communicating using OAM waveforms (e.g., as described in connection with the antenna array type parameter 908 of FIG. 9), an antenna elements parameter indicating a quantity of antenna elements of the antenna array (e.g., as described in connection with the antenna elements parameter 910 of FIG. 9), a radius parameter indicating a radius associated with the antenna array (e.g., as described in connection with the radius parameter 912 of FIG. 9), and/or a distance parameter indicating a distance between one or more antenna elements of the antenna array (e.g., as described in connection with the distance parameter 914 of FIG. 9).

In some examples, the OAM capability information may include a misalignment corrections parameter indicating that the first communication device has the capability to correct misalignment of OAM waveforms at the first communication device, as described in connection with the misalignment corrections parameter 916 of FIG. 9. In some examples, the OAM capability information may further include correctional parameters indicating a maximal correction in distance and per axis. In some such examples, the second communication device may use the correctional parameters to adjust the one or more OAM transmissions to the first communication device.

In some examples, the OAM capability information may include a misalignment corrections parameter indicating a lack of capability to correct misalignment of OAM waveforms at the first communication device, as described in connection with the misalignment corrections parameter 916 of FIG. 9.

In some examples, the OAM capability information may include a polarizations parameter indicating a quantity of polarizations supported by the first communication device, as described in connection with the polarizations parameter 920 of FIG. 9. In some examples, the polarizations parameter may indicate a type of polarizations supported by the first communication device. In some examples, the polarizations parameter may indicate the quantity of polarizations supported per OAM index. In some examples, the polarizations parameter may indicate a type of polarization supported per OAM index.

Figure 16:
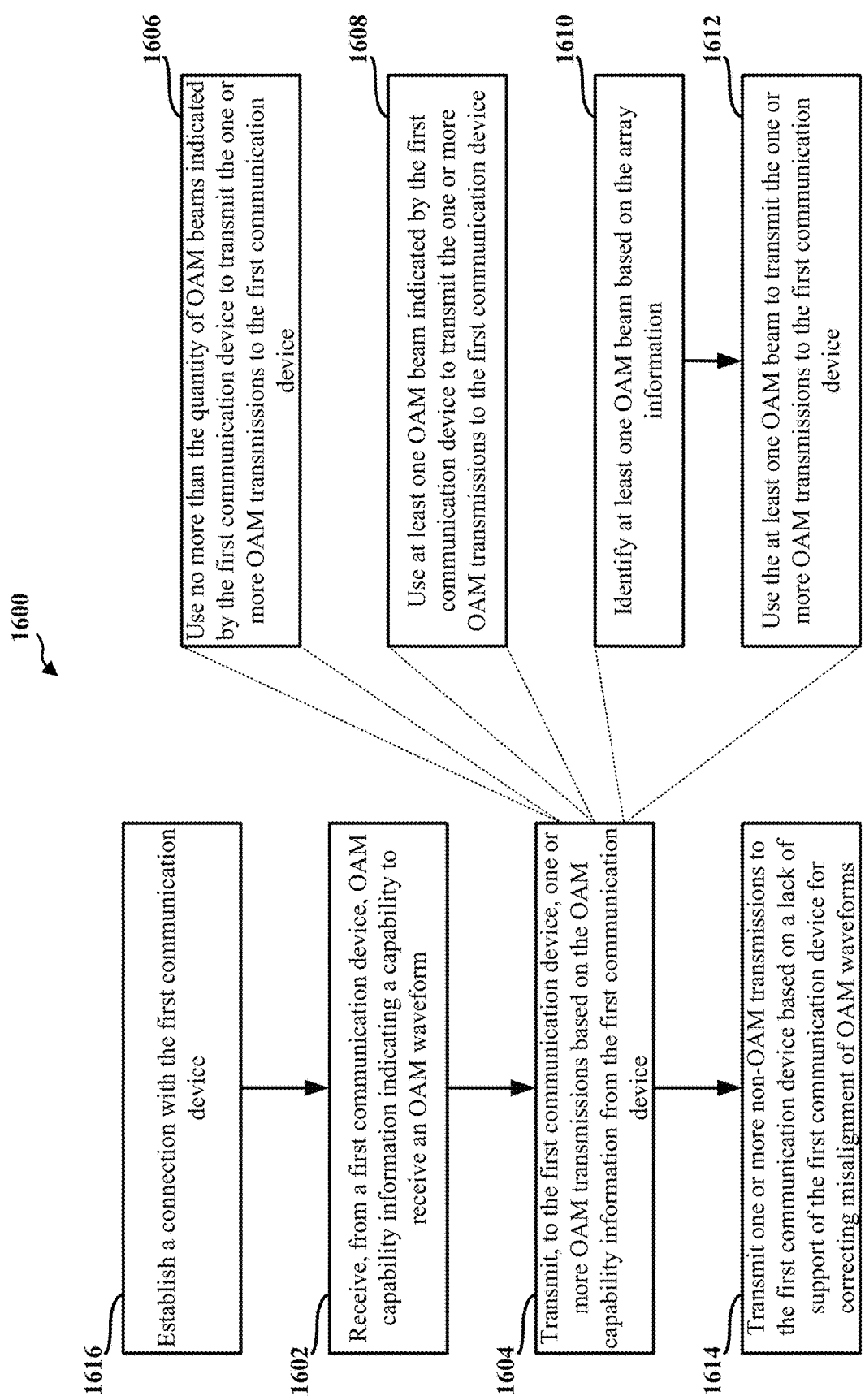
FIG. 16 is a flowchart of a method of wireless communication at a second communication device, in accordance with the teachings disclosed herein.

FIG. 16 is a flowchart 1600 of a method of wireless communication. The method may be performed by a second communication device (e.g., the base station 102/180, the base station 310, the second communication device 952, the second communication device 1104, and/or an apparatus 1702 of FIG. 17). The method may facilitate improving communication between a first communication device and a second communication by enabling the first communication device to signal support of communicating using OAM waveforms to the second communication device.

In some examples, the communication between the first communication device and the second communication device may comprise a downlink transmission. In some such examples, the first communication device may comprise a UE and the second communication device may comprise a base station. In some examples, the communication between the first communication device and the second communication device may comprise an uplink transmission. In some such examples, the second communication device may comprise a UE and the first communication device may comprise a base station. In some examples, the communication between the first communication device and the second communication device may comprise a sidelink transmission. In some such examples, the first communication device may comprise a first sidelink device and the second communication device may comprise a second sidelink device. In some examples, at least one of the first communication device or the second communication device may comprise a relay node, such as an IAB node.

At 1602, the second communication device receives, from a first communication device, OAM capability information indicating support for reception of an OAM waveform, as described in connection with the OAM capability information 1120 of FIG. 11. For example, 1602 may be performed by a capabilities component 1740 of the apparatus 1702 of FIG. 17.

At 1604, the second communication device transmits, to the first communication device, one or more OAM transmissions based on the OAM capability information from the first communication device, as described in connection with the OAM transmission(s) 1150 of FIG. 11. For example, 1604 may be performed by an OAM transmission component 1742 of the apparatus 1702 of FIG. 17.

In some examples, the OAM capability information may include an OAM capability parameter indicating that the first communication device has the capability to receive and separate different OAM beams, as described in connection with the OAM capability parameter 902 of FIG. 9. In some such examples, the second communication device may transmit (e.g., at 1604) the one or more OAM transmissions to the first communication device based on support of the first communication device for receiving and separating different OAM beams.

In some examples, the OAM capability information may include an OAM beams parameter indicating a quantity of OAM beams that the first communication device supports, as described in connection with the OAM beams parameter 904 of FIG. 9. In such examples, at 1606, the second communication device may use no more than the quantity of OAM beams indicated by the first communication device to transmit the one or more OAM transmissions to the first communication device, as described in connection with 1130 and 1140 of FIG. 11. For example, 1606 may be performed by the OAM transmission component 1742 of the apparatus 1702 of FIG. 17.

In some examples, the OAM capability information may include an index parameter indicating an index for each of one or more OAM beams that the first communication device supports, as described in connection with the index parameter 906 of FIG. 9 and/or the table 1000 of FIG. 10. In such examples, at 1608, the second communication device may use at least one OAM beam indicated by the first communication device to transmit the one or more OAM transmissions to the first communication device, as described in connection with 1130 and 1140 of FIG. 11. For example, 1608 may be performed by the OAM transmission component 1742 of the apparatus 1702 of FIG. 17.

In some examples, the OAM capability information may include array information including one or more of: an antenna array type parameter indicating a type of antenna array of the first communication device for communicating using OAM waveforms (e.g., as described in connection with the antenna array type parameter 908 of FIG. 9), an antenna elements parameter indicating a quantity of antenna elements of the antenna array (e.g., as described in connection with the antenna elements parameter 910 of FIG. 9), a radius parameter indicating a radius associated with the antenna array (e.g., as described in connection with the radius parameter 912 of FIG. 9), and/or a distance parameter indicating a distance between one or more antenna elements of the antenna array (e.g., as described in connection with the distance parameter 914 of FIG. 9). In such examples, at 1610, the second communication device may identify at least one OAM beam based on the array information, as described in connection with 1130 and 1140 of FIG. 11. For example, 1610 may be performed by an OAM beam identification component 1744 of the apparatus 1702 of FIG. 17.

At 1612, the second communication may use the at least one OAM beam to transmit the one or more OAM transmissions to the first communication device, as described in connection with 1130 and 1140 of FIG. 11. For example, 1612 may be performed by the OAM transmission component 1742 of the apparatus 1702 of FIG. 17.

In some examples, the OAM capability information may include a misalignment corrections parameter indicating that the first communication device has the capability to correct misalignment of OAM waveforms at the first communication device, as described in connection with the misalignment corrections parameter 916 of FIG. 9. In such examples, the second communication device may transmit (e.g., at 1604) the one or more OAM transmissions to the first communication device based on support of the first communication device for correcting misalignment of OAM waveforms. In some examples, the OAM capability information may further include correctional parameters indicating a maximal correction in distance and per axis. In some such examples, the second communication device may use the correctional parameters to adjust the one or more OAM transmissions to the first communication device.

In some examples, the OAM capability information may include a misalignment corrections parameter indicating a lack of capability to correct misalignment of OAM waveforms at the first communication device, as described in connection with the misalignment corrections parameter 916 of FIG. 9. In such examples, at 1614, the second communication device may transmit one or more non-OAM transmissions to the first communication device based on a lack of support of the first communication device for correcting misalignment of OAM waveforms, as described in connection with the non-OAM transmission(s) 1152 of FIG. 11. For example, 1614 may be performed by a non-OAM transmission component 1746 of the apparatus 1702 of FIG. 17.

In some examples, the OAM capability information may include a polarizations parameter indicating a quantity of polarizations supported by the first communication device, as described in connection with the polarizations parameter 920 of FIG. 9. In such examples, the second communication device may transmit (e.g., at 1604) the one or more OAM transmissions to the first communication device based on the quantity of polarizations supported by the first communication device. In some examples, the polarizations parameter may indicate a type of polarizations supported by the first communication device. In some examples, the polarizations parameter may indicate the quantity of polarizations supported per OAM index. In some examples, the polarizations parameter may indicate a type of polarization supported per OAM index.

In some examples, at 1616, the second communication device may establish a connection with the first communication device, as described in connection with the connection establishment procedure 1110 of FIG. 11. For example, 1616 may be performed by a connection establishment component 1748 of the apparatus 1702 of FIG. 17. In some examples, the second communication device may receive the OAM capability information from the first communication device (e.g., at 1602) after establishing the connection with the first communication device.

Figure 17:
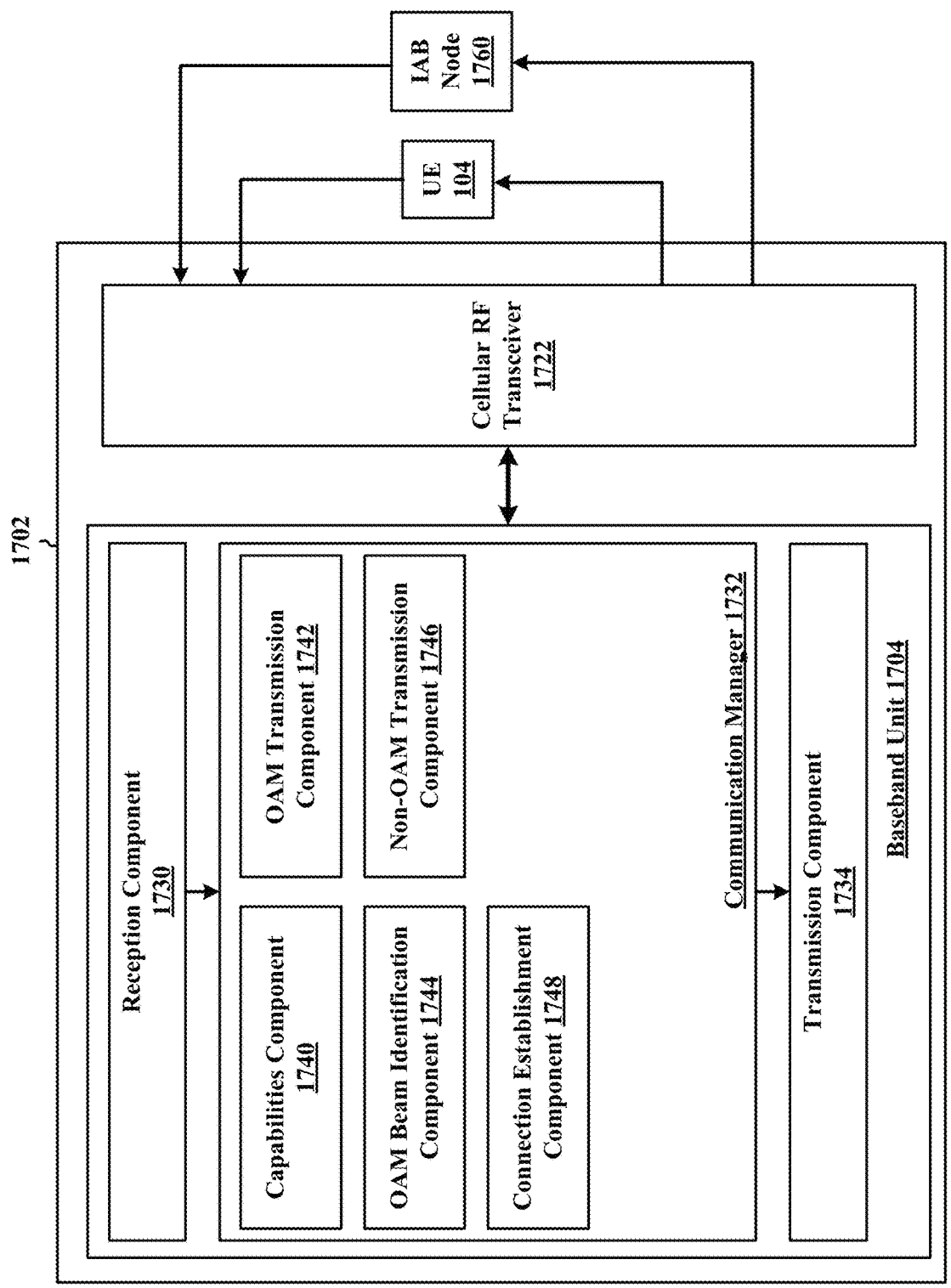
FIG. 17 is a diagram illustrating an example of a hardware implementation for an example apparatus, in accordance with the teachings disclosed herein.

FIG. 17 is a diagram 1700 illustrating an example of a hardware implementation for an apparatus 1702 that is configured to perform the aspects described in connection with FIGS. 15 and/or 16. In some examples, the apparatus 1702 may be a base station. In other examples, the apparatus 1702 may be a relay node, such as an IAB node. In other examples, the apparatus 1702 may be a UE. The apparatus 1702 includes a baseband unit 1704. The baseband unit 1704 may communicate through a cellular RF transceiver 1722 with the UE 104 and/or an IAB node 1760. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the base station 310 and may include the memory 376 and/or at least one of the TX processor 316, the RX processor 370, and the controller/processor 375.

The communication manager 1732 includes a capabilities component 1740 that is configured to receive, from a first communication device, OAM capability information indicating support for reception of an OAM waveform, for example, as described in connection with 1502 of FIG. 15 and/or 1602 of FIG. 16.

The communication manager 1732 also includes an OAM transmission component 1742 that is configured to transmit one or more OAM transmission based on the OAM capability information from the first communication device, for example, as described in connection with 1504 of FIG. 15 and/or 1604 of FIG. 16. The example OAM transmission component 1742 may also be configured to use no more than the quantity of OAM beams indicated by the first communication device to transmit the one or more OAM transmissions to the first communication device, for example, as described in connection 1606 of FIG. 16.

The example OAM transmission component 1742 may also be configured to use at least one OAM beam indicated by the first communication device to transmit the one or more OAM transmissions to the first communication device, for example, as described in connection with 1608 of FIG. 16.

The example OAM transmission component 1742 may also be configured to use the at least one OAM beam to transmit the one or more OAM transmissions to the first communication device, for example, as described in connection with 1612 of FIG. 16.

The communication manager 1732 also includes an OAM beam identification component 1744 that is configured to identify at least one OAM beam based on the array information, for example, as described in connection with 1610 of FIG. 16.

The communication manager 1732 also includes a non-OAM transmission component 1746 that is configured to transmit one or more non-OAM transmissions to the first communication device based on a lack of support of the first communication device for correcting misalignment of OAM waveform, for example, as described in connection with 1614 of FIG. 16.

The communication manager 1732 also includes a connection establishment component 1748 that is configured to establish a connection with the first communication device, for example, as described in connection with 1616 of FIG. 16.

The apparatus may include additional components that perform each of the blocks of the algorithm in the flowcharts of FIGS. 15 and/or 16. As such, each block in the flowcharts of FIGS. 15 and/or 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the baseband unit 1704, includes means for receiving, from a first communication device, OAM capability information indicating support for reception of an OAM waveform. The example apparatus 1702 also includes means for transmitting, from a second communication device to the first communication device, one or more OAM transmissions based on the OAM capability information from the first communication device.

In another configuration, the example apparatus 1702 also includes means for using no more than the quantity of OAM beams indicated by the first communication device to transmit the one or more OAM transmissions to the first communication device.

In another configuration, the example apparatus 1702 also includes means for using at least one OAM beam indicated by the first communication device to transmit the one or more OAM transmissions to the first communication device.

In another configuration, the example apparatus 1702 also includes means for identifying at least one OAM beam based on the array information. The example apparatus 1702 also includes means for using the at least one OAM beam to transmit the one or more OAM transmissions to the first communication device.

In another configuration, the example apparatus 1702 also includes means for transmitting one or more non-OAM transmissions to the first communication device based on a lack of support of the first communication device for correcting misalignment of OAM waveforms.

The means may be one or more of the components of the apparatus 1702 configured to perform the functions recited by the means. As described supra, the apparatus 1702 may include the TX processor 316, the RX processor 370, and the controller/processor 375. As such, in one configuration, the means may be the TX processor 316, the RX processor 370, and the controller/processor 375 configured to perform the functions recited by the aforementioned means.

Aspects disclosed herein provide a framework to facilitate a wireless communication device to indicate whether the wireless communication device has the capability to communicate using OAM transmissions. For example, aspects presented herein provide for a first wireless communication device to transmit OAM capability information to a second wireless communication device. Based on the OAM capability information, the first wireless communication device and the second wireless communication device may communicate using OAM transmissions or non-OAM transmissions (e.g., signals on which OAM is not applied). When the first wireless communication device indicates a capability to use OAM beams, communication between a transmitting device and a receiving device may be OAM-based, which may enable the transmitting device to use multiple streams for communication, which may improve communication performance by, for example, increasing throughput (e.g., higher data rates and/or capacity) and/or improving spectral efficiency.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a first communication device, comprising: transmitting, to a second communication device, orbital angular momentum (OAM) capability information indicating support for reception of an OAM waveform; and receiving one or more OAM transmissions from the second communication device, the one or more OAM transmissions based on the OAM capability information.

Aspect 2 is the method of aspect 1, further including that the OAM capability information comprises an OAM capability parameter indicating that the first communication device has a capability to receive and separate different OAM beams.

Aspect 3 is the method of any of aspect 1 or aspect 2, further including that the OAM capability information comprises an OAM beams parameter indicating a quantity of OAM beams supported by the first communication device.

Aspect 4 is the method of any of aspects 1 to 3, further including that the OAM capability information comprises an index parameter indicating an index for each of one or more OAM beams supported by the first communication device.

Aspect 5 is the method of any of aspects 1 to 4, further including that the OAM capability information comprises one or more of: an antenna array type parameter indicating a type of antenna array of the first communication device for communicating using OAM waveforms, an antenna elements parameter indicating a quantity of antenna elements of the antenna array, a radius parameter indicating a radius associated with the antenna array, or a distance parameter indicating a distance between one or more antenna elements of the antenna array.

Aspect 6 is the method of any of aspects 1 to 5, further including that the OAM capability information comprises a misalignment corrections parameter indicating that the first communication device has a capability to correct misalignment of OAM waveforms at the first communication device.

Aspect 7 is the method of any of aspects 1 to 6, further including that the OAM capability information further comprises correctional parameters indicating a maximal correction in distance and per axis.

Aspect 8 is the method of any of aspects 1 to 7, further including that the OAM capability information comprises a misalignment corrections parameter indicating a lack of capability to correct misalignment of OAM waveforms at the first communication device, the method further comprising: receiving one or more non-OAM transmissions from the second communication device based on a lack of support for correcting misalignment of OAM waveforms at the first communication device.

Aspect 9 is the method of any of aspects 1 to 8, further including that the OAM capability information comprises a polarizations parameter indicating a quantity of polarizations supported by the first communication device.

Aspect 10 is the method of any of aspects 1 to 9, further including that the polarizations parameter indicates the quantity of polarizations supported per OAM index.

Aspect 11 is the method of any of aspects 1 to 10, further including that the polarizations parameter indicates a type of polarization supported per OAM index.

Aspect 12 is the method of any of aspects 1 to 11, further including that the OAM capability information comprises: an OAM capability parameter indicating that the first communication device has a capability to receive and separate different OAM beams, and at least one of: an OAM beams parameter indicating a quantity of OAM beams supported by the first communication device, or an index parameter indicating an index for each of one or more OAM beams supported by the first communication device.

Aspect 13 is the method of any of aspects 1 to 12, further including: establishing a connection with the second communication device, wherein the first communication device transmits the OAM capability information to the second communication device after establishing the connection with the second communication device.

Aspect 14 is the method of any of aspects 1 to 13, further including that the first communication device comprises a user equipment and the second communication device comprises a base station.

Aspect 15 is the method of any of aspects 1 to 13, further including that the second communication device comprises a base station and the first communication device comprises a user equipment.

Aspect 16 is the method of any of aspects 1 to 13, further including that the first communication device comprises a first sidelink device and the second communication device comprises a second sidelink device.

Aspect 17 is the method of any of aspects 1 to 13, further including that at least one of the first communication device or the second communication device comprises an integrated access and backhaul (IAB) node.

Aspect 18 is an apparatus for wireless communication including a memory and at least one processor coupled to a memory, the memory and the at least one processor configured to implement a method as in any of aspects 1 to 17.

Aspect 19 is an apparatus for wireless communication including means for implementing a method as in any of aspects 1 to 17.

Aspect 20 is a non-transitory computer-readable storage medium storing computer executable code, where the code, when executed, causes a processor to implement a method as in any of aspects 1 to 17.

Aspect 21 is a method of wireless communication with a first communication device at a second communication device, comprising: receiving, from the first communication device, orbital angular momentum (OAM) capability information indicating a capability to receive an OAM waveform; and transmitting, to the first communication device, one or more OAM transmissions based on the OAM capability information from the first communication device.

Aspect 22 is the method of aspect 21, further including that the OAM capability information comprises an OAM capability parameter indicating that the first communication device has a capability to receive and separate different OAM beams, and wherein the second communication device transmits the one or more OAM transmissions to the first communication device based on the capability to receive and separate different OAM beams at the first communication device.

Aspect 23 is the method of any of aspect 21 or aspect 22, further including that the OAM capability information comprises an OAM beams parameter indicating a quantity of OAM beams supported by the first communication device, the method further comprising: using no more than the quantity of OAM beams indicated by the first communication device to transmit the one or more OAM transmissions to the first communication device.

Aspect 24 is the method of any of aspects 21 to 23, further including that the OAM capability information comprises an index parameter indicating an index for each of one or more OAM beams supported by the first communication device, the method further comprising: using at least one OAM beam indicated by the first communication device to transmit the one or more OAM transmissions to the first communication device.

Aspect 25 is the method of any of aspects 21 to 24, further including that the OAM capability information comprises array information including one or more of: an antenna array type parameter indicating a type of antenna array of the first communication device for communicating using OAM waveforms, an antenna elements parameter indicating a quantity of antenna elements of the antenna array, a radius parameter indicating a radius associated with the antenna array, or a distance parameter indicating a distance between one or more antenna elements of the antenna array.

Aspect 26 is the method of any of aspects 21 to 25, further including: identifying at least one OAM beam based on the array information; and using the at least one OAM beam to transmit the one or more OAM transmissions to the first communication device.

Aspect 27 is the method of any of aspects 21 to 26, further including that the OAM capability information comprises a misalignment corrections parameter indicating that the first communication device has a capability to correct misalignment of OAM waveforms at the first communication device, and wherein the second communication device transmits the one or more OAM transmissions to the first communication device based on the capability to correct misalignment of OAM waveforms at the first wireless communication device.

Aspect 28 is the method of any of aspects 21 to 27, further including that the OAM capability information further comprises correctional parameters indicating a maximal correction in distance and per axis, and wherein the second communication device uses the correctional parameters to adjust the one or more OAM transmissions to the first communication device.

Aspect 29 is the method of any of aspects 21 to 28, further including that the OAM capability information comprises a misalignment corrections parameter indicating a lack of capability to correct misalignment of OAM waveforms at the first communication device, the method further comprising: transmitting one or more non-OAM transmissions to the first communication device based on the lack of capability to correct misalignment of OAM waveforms at the first communication device.

Aspect 30 is the method of any of aspects 21 to 29, further including that the OAM capability information comprises a polarizations parameter indicating a quantity of polarizations supported by the first communication device, and wherein the second communication device transmits the one or more OAM transmissions to the first communication device based on the quantity of polarizations supported by the first communication device.

Aspect 31 is the method of any of aspects 21 to 30, further including that the polarizations parameter indicates the quantity of polarizations supported per OAM index.

Aspect 32 is the method of any of aspects 21 to 31, further including that the polarizations parameter indicates a type of polarization supported per OAM index.

Aspect 33 is the method of any of aspects 21 to 32, further including that the first communication device comprises a user equipment and the second communication device comprises a base station.

Aspect 34 is the method of any of aspects 21 to 32, further including that the first communication device comprises a base station and the second communication device comprises a user equipment.

Aspect 35 is the method of any of aspects 21 to 32, further including that the first communication device comprises a first sidelink device and the second communication device comprises a second sidelink device.

Aspect 36 is the method of any of aspects 21 to 32, further including that at least one of the first communication device or the second communication device comprises an integrated access and backhaul (IAB) node.

Aspect 37 is an apparatus for wireless communication including a memory and at least one processor coupled to a memory, the memory and the at least one processor configured to implement a method as in any of aspects 21 to 36.

Aspect 38 is an apparatus for wireless communication including means for implementing a method as in any of aspects 21 to 36.

Aspect 39 is a non-transitory computer-readable storage medium storing computer executable code, where the code, when executed, causes a processor to implement a method as in any of aspects 21 to 36

Aspect 40 is a method of wireless communication at a receiving device, comprising: transmitting, to a transmitting device, orbital angular momentum (OAM) capability information indicating support for reception of an OAM waveform; and receiving one or more OAM transmissions from the transmitting device, the one or more OAM transmissions based on the OAM capability information.

Aspect 41 is an apparatus for wireless communication including a memory and at least one processor coupled to a memory, the memory and the at least one processor configured to implement a method as in aspect 40.

Aspect 42 is an apparatus for wireless communication including means for implementing a method as in aspect 40.

Aspect 43 is a non-transitory computer-readable storage medium storing computer executable code, where the code, when executed, causes a processor to implement a method as in aspect 40.

Aspect 44 is a method of wireless communication with a receiving device at a transmitting device, comprising: receiving, from the receiving device, orbital angular momentum (OAM) capability information indicating a capability to receive an OAM waveform; and transmitting, to the receiving device, one or more OAM transmissions based on the OAM capability information from the receiving device.

Aspect 45 is an apparatus for wireless communication including a memory and at least one processor coupled to a memory, the memory and the at least one processor configured to implement a method as in aspect 44.

Aspect 46 is an apparatus for wireless communication including means for implementing a method as in aspect 44.

Aspect 47 is a non-transitory computer-readable storage medium storing computer executable code, where the code, when executed, causes a processor to implement a method as in aspect 44.

What is claimed is:

1. An apparatus for wireless communication at a first communication device, comprising:
    one or more memories; and
    one or more processors coupled to the one or more memories, the one or more processors configured to cause the first communication device to:
        transmit orbital angular momentum (OAM) capability information configured to indicate a first capability to receive an OAM waveform and a polarizations parameter configured to indicate a quantity of polarizations supported by the first communication device; and receive one or more OAM transmissions based on the OAM capability information.

2. The apparatus of claim 1, wherein the OAM capability information comprises an OAM capability parameter configured to indicate that the first communication device has a second capability to separate different received OAM beams.

3. The apparatus of claim 1, wherein the OAM capability information comprises an OAM beams parameter configured to indicate a quantity of OAM beams supported by the first communication device.

4. The apparatus of claim 1, wherein the OAM capability information comprises an index parameter configured to indicate an index for each of one or more OAM beams supported by the first communication device.

5. The apparatus of claim 1, wherein the OAM capability information comprises one or more of:
an antenna array type parameter configured to indicate a type of antenna array of the first communication device for communicating using OAM waveforms,
an antenna elements parameter configured to indicate a quantity of antenna elements of the antenna array,
a radius parameter configured to indicate a radius associated with the antenna array, or
a distance parameter configured to indicate a distance between one or more antenna elements of the antenna array.

6. The apparatus of claim 1, wherein the polarizations parameter is configured to indicate the quantity of polarizations supported per OAM index.

7. The apparatus of claim 1, wherein the polarizations parameter is configured to indicate a type of polarization supported per OAM index.

8. The apparatus of claim 1, wherein the OAM capability information comprises:
an OAM capability parameter configured to indicate that the first communication device has a second capability to separate different received OAM beams, and
at least one of:
an OAM beams parameter configured to indicate a quantity of OAM beams supported by the first communication device, or
an index parameter configured to indicate an index for each of one or more OAM beams supported by the first communication device.

9. The apparatus of claim 1, wherein the one or more processors are further configured to cause the first communication device to:
establish a connection with a second communication device; and
transmit the OAM capability information to the second communication device after establishing the connection with the second communication device.

10. The apparatus of claim 1, wherein
the first communication device comprises a first user equipment and a second communication device in communication with the first communication device comprises a first base station, or
the second communication device comprises a second base station and the first communication device comprises a second user equipment, or the first communication device comprises a first sidelink device and the second communication device comprises a second sidelink device, or
at least one of the first communication device or the second communication device comprises an integrated access and backhaul (IAB) node.

11. The apparatus of claim 1, further comprising one or more transceivers coupled to the one or more processors.

12. The apparatus of claim 1, wherein the one or more processors are configured, individually or in combination, to transmit the OAM capability information configured to indicate the first capability to receive the OAM waveform and the polarizations parameter configured to indicate the quantity of polarizations supported by the first communication device, and to receive the one or more OAM transmissions.

13. A method of wireless communication at a first communication device, comprising:
transmitting orbital angular momentum (OAM) capability information indicating a first capability to receive an OAM waveform and a polarizations parameter indicating a quantity of polarizations supported by the first communication device; and
receiving one or more OAM transmissions based on the OAM capability information.

14. The method of claim 13, wherein the OAM capability information comprises an OAM capability parameter indicating that the first communication device has a second capability to separate different received OAM beams.

15. The method of claim 13, wherein the polarizations parameter indicates the quantity of polarizations supported per OAM index.

16. The method of claim 13, wherein the polarizations parameter indicates a type of polarization supported per OAM index.

17. The method of claim 13, further comprising:
establishing a connection with a second communication device; and
transmitting the OAM capability information to the second communication device after establishing the connection with the second communication device.

18. An apparatus for wireless communication with a first communication device at a second communication device, comprising:
one or more memories; and
one or more processors coupled to the one or more memories, the one or more processors configured to cause the second communication device to:
receive orbital angular momentum (OAM) capability information configured to indicate a first capability to receive an OAM waveform and a polarizations parameter configured to indicate a quantity of polarizations supported by the first communication device; and
transmit one or more OAM transmissions based on the OAM capability information received from the first communication device.

19. The apparatus of claim 18, wherein the OAM capability information comprises an OAM capability parameter configured to indicate that the first communication device has a second capability to separate different received OAM beams, and the one or more processors are configured to cause the second communication device to:
transmit the one or more OAM transmissions to the first communication device based on the second capability at the first communication device.

20. The apparatus of claim 18, wherein the OAM capability information comprises an OAM beams parameter configured to indicate a first quantity of OAM beams supported by the first communication device, and the one or more processors are further configured to cause the second communication device to:
use a second quantity of OAM beams to transmit the one or more OAM transmissions to the first communication device, the second quantity of OAM beams being less than or equal to the first quantity of OAM beams.

21. The apparatus of claim 18, wherein the OAM capability information comprises an index parameter configured to indicate an index for each of one or more OAM beams supported by the first communication device, and the one or more processors are further configured to cause the second communication device to:
use at least one OAM beam indicated by the first communication device to transmit the one or more OAM transmissions to the first communication device.

22. The apparatus of claim 18, wherein the OAM capability information comprises array information including one or more of:
an antenna array type parameter configured to indicate a type of antenna array of the first communication device for communicating using OAM waveforms,
an antenna elements parameter configured to indicate a quantity of antenna elements of the antenna array,
a radius parameter configured to indicate a radius associated with the antenna array, or
a distance parameter configured to indicate a distance between one or more antenna elements of the antenna array.

23. The apparatus of claim 22, wherein the one or more processors are further configured to cause the second communication device to:
identify at least one OAM beam based on the array information; and
use the at least one OAM beam to transmit the one or more OAM transmissions to the first communication device.

24. The apparatus of claim 18, wherein the one or more processors are further configured to cause the second communication device to:
transmit the one or more OAM transmissions to the first communication device based on the quantity of the polarizations supported by the first communication device.

25. The apparatus of claim 18, wherein the polarizations parameter is configured to indicate the quantity of the polarizations supported per OAM index.

26. The apparatus of claim 18, wherein the polarizations parameter is configured to indicate a type of polarization supported per OAM index.

27. The apparatus of claim 18, further comprising one or more transceivers coupled to the one or more processors.

28. The apparatus of claim 18, wherein the one or more processors are configured, individually or in combination, to receive the OAM capability information configured to indicate the first capability to receive the OAM waveform and the polarizations parameter configured to indicate the quantity of polarizations supported by the first communication device, and to transmit the one or more OAM transmissions based on the OAM capability information received from the first communication device.

29. A method of wireless communication with a first communication device at a second communication device, comprising:

receiving orbital angular momentum (OAM) capability information indicating a first capability to receive an OAM waveform and a polarizations parameter indicating a quantity of polarizations supported by the first communication device; and
transmitting one or more OAM transmissions based on the OAM capability information received from the first communication device.

30. The method of claim 29, wherein the OAM capability information comprises an OAM capability parameter indicating that the first communication device has a second capability to separate different received OAM beams, the method further comprising:
transmitting the one or more OAM transmissions to the first communication device based on the second capability at the first communication device.

31. The method of claim 29, further comprising:
transmitting the one or more OAM transmissions to the first communication device based on the quantity of the polarizations supported by the first communication device.

32. The method of claim 29, wherein the polarizations parameter indicates the quantity of the polarizations supported per OAM index.

33. The method of claim 29, wherein the polarizations parameter indicates a type of polarization supported per OAM index.

34. A non-transitory computer-readable storage medium comprising computer-executable code at a first communication device, the computer-executable code, when executed, causes one or more processors to cause the first communication device to:
transmit orbital angular momentum (OAM) capability information indicating a first capability to receive an OAM waveform and a polarizations parameter indicating a quantity of polarizations supported by the first communication device; and
receive one or more OAM transmissions based on the OAM capability information.

35. The non-transitory computer-readable storage medium of claim 34, wherein the OAM capability information comprises an OAM capability parameter indicating that the first communication device has a second capability to separate different received OAM beams.

36. The non-transitory computer-readable storage medium of claim 34, wherein the polarizations parameter indicates the quantity of polarizations supported per OAM index.

37. The non-transitory computer-readable storage medium of claim 34, wherein the polarizations parameter indicates a type of polarization supported per OAM index.

38. The non-transitory computer-readable storage medium of claim 34, wherein the computer-executable code, when executed, further causes the one or more processors to cause the first communication device to:
establish a connection with a second communication device; and
transmit the OAM capability information to the second communication device after establishing the connection with the second communication device.

39. A non-transitory computer-readable storage medium comprising computer-executable code for wireless communication with a first communication device at a second communication device, the computer-executable code, when executed, causes one or more processors to cause the second communication device to:

receive orbital angular momentum (OAM) capability information indicating a first capability to receive an OAM waveform and a polarizations parameter indicating a quantity of polarizations supported by the first communication device; and transmit one or more OAM transmissions based on the OAM capability information received from the first communication device.

40. The non-transitory computer-readable storage medium of claim 39, wherein the OAM capability information comprises an OAM capability parameter indicating that the first communication device has a second capability to separate different received OAM beams, and wherein the computer-executable code, when executed, further causes the one or more processors to cause the second communication device to:

transmit the one or more OAM transmissions to the first communication device based on the second capability at the first communication device.

41. The non-transitory computer-readable storage medium of claim 39, wherein the computer-executable code, when executed, further causes the one or more processors to cause the second communication device to:

transmit the one or more OAM transmissions to the first communication device based on the quantity of the polarizations supported by the first communication device.

42. The non-transitory computer-readable storage medium of claim 39, wherein the polarizations parameter indicates the quantity of the polarizations supported per OAM index.

43. The non-transitory computer-readable storage medium of claim 39, wherein the polarizations parameter indicates a type of polarization supported per OAM index.

44. An apparatus for wireless communication at a first communication device, comprising:
one or more memories; and
one or more processors coupled to the one or more memories, the one or more processors configured to cause the first communication device to:
transmit orbital angular momentum (OAM) capability information configured to indicate a first capability to receive an OAM waveform and a second capability to correct misalignments of OAM waveforms at the first communication device; and
receive one or more OAM transmissions based on the OAM capability information.

45. The apparatus of claim 44, wherein the OAM capability information further comprises correctional parameters configured to indicate a maximal correction in distance and per axis.

46. The apparatus of claim 44, wherein the OAM capability information comprises a polarizations parameter configured to indicate a quantity of polarizations supported by the first communication device.

47. The apparatus of claim 44, wherein the OAM capability information comprises an OAM capability parameter configured to indicate that the first communication device has a third capability to separate different received OAM beams.

48. The apparatus of claim 44, wherein the one or more processors are configured, individually or in combination, to transmit the OAM capability information configured to indicate the first capability to receive the OAM waveform and the second capability to correct the misalignments of the OAM waveforms at the first communication device, and to receive the one or more OAM transmissions.

49. A method of wireless communication at a first communication device, comprising:
transmitting orbital angular momentum (OAM) capability information indicating a first capability to receive an OAM waveform and a second capability to correct misalignments of OAM waveforms at the first communication device; and
receiving one or more OAM transmissions based on the OAM capability information.

50. The method of claim 49, wherein the OAM capability information further comprises correctional parameters indicating a maximal correction in distance and per axis.

51. The method of claim 49, wherein the OAM capability information comprises a polarizations parameter indicating a quantity of polarizations supported by the first communication device.

52. The method of claim 49, wherein the OAM capability information comprises an OAM capability parameter indicating that the first communication device has a third capability to separate different received OAM beams.

53. A non-transitory computer-readable storage medium comprising computer-executable code at a first communication device, the computer-executable code, when executed, causes one or more processors to cause the first communication device to:
transmit orbital angular momentum (OAM) capability information indicating a first capability to receive an OAM waveform and a second capability to correct misalignments of OAM waveforms at the first communication device; and
receive one or more OAM transmissions based on the OAM capability information.

54. The non-transitory computer-readable storage medium of claim 53, wherein the OAM capability information further comprises correctional parameters indicating a maximal correction in distance and per axis.

55. The non-transitory computer-readable storage medium of claim 53, wherein the OAM capability information comprises a polarizations parameter indicating a quantity of polarizations supported by the first communication device.

56. The non-transitory computer-readable storage medium of claim 53, wherein the OAM capability information comprises an OAM capability parameter indicating that the first communication device has a third capability to separate different received OAM beams.

57. An apparatus for wireless communication at a first communication device, comprising:
one or more memories; and
one or more processors coupled to the one or more memories, the one or more processors configured to cause the first communication device to:
transmit orbital angular momentum (OAM) capability information configured to indicate a first capability to receive an OAM waveform and a misalignment corrections parameter configured to indicate a lack of a second capability to correct misalignments of OAM waveforms at the first communication device; and
receive one or more non-OAM transmissions based on the lack of the second capability at the first communication device.

58. The apparatus of claim 57, wherein the one or more processors are configured, individually or in combination, to transmit the OAM capability information configured to indicate the first capability to receive the OAM waveform and the misalignment corrections parameter configured to indicate the lack of the second capability to correct the misalignments of the OAM waveforms at the first communication device, and to receive the one or more non-OAM transmissions based on the lack of the second capability at the first communication device.

59. A method of wireless communication at a first communication device, comprising:
transmitting orbital angular momentum (OAM) capability information indicating a first capability to receive an OAM waveform and a misalignment corrections parameter indicating a lack of a second capability to correct misalignments of OAM waveforms at the first communication device; and
receiving one or more non-OAM transmissions based on the lack of the second capability at the first communication device.

60. A non-transitory computer-readable storage medium comprising computer-executable code at a first communication device, the computer-executable code, when executed, causes one or more processors to cause the first communication device to:
transmit orbital angular momentum (OAM) capability information indicating a first capability to receive an OAM waveform and a misalignment corrections parameter indicating a lack of a second capability to correct misalignments of OAM waveforms at the first communication device; and
receive one or more non-OAM transmissions based on the lack of the second capability at the first communication device.

61. An apparatus for wireless communication with a first communication device at a second communication device, comprising:
one or more memories; and
one or more processors coupled to the one or more memories, the one or more processors configured to cause the second communication device to:
receive orbital angular momentum (OAM) capability information configured to indicate a first capability to receive an OAM waveform and a second capability to correct misalignments of OAM waveforms at the first communication device; and
transmit one or more OAM transmissions based on the OAM capability information received from the first communication device.

62. The apparatus of claim 57, wherein the OAM capability information further comprises correctional parameters configured to indicate a maximal correction in distance and per axis, and the one or more processors are further configured to cause the second communication device to:
use the correctional parameters to adjust the one or more OAM transmissions to the first communication device.

63. The apparatus of claim 61, wherein the OAM capability information comprises a polarizations parameter configured to indicate a quantity of polarizations supported by the first communication device, and the one or more processors are configured to cause the second communication device to:
transmit the one or more OAM transmissions to the first communication device based on the quantity of the polarizations supported by the first communication device.

64. The apparatus of claim 61, wherein the OAM capability information comprises an OAM capability parameter configured to indicate that the first communication device has a third capability to separate different received OAM beams, and the one or more processors are configured to cause the second communication device to:
transmit the one or more OAM transmissions to the first communication device based on the second capability at the first communication device.

65. The apparatus of claim 61, wherein the one or more processors are configured, individually or in combination, to receive the OAM capability information configured to indicate the first capability to receive the OAM waveform and the second capability to correct the misalignments of the OAM waveforms at the first communication device, and to transmit the one or more OAM transmissions based on the OAM capability information received from the first communication device.

66. A method of wireless communication with a first communication device at a second communication device, comprising:
receiving orbital angular momentum (OAM) capability information indicating a first capability to receive an OAM waveform and a second capability to correct misalignments of OAM waveforms at the first communication device; and
transmitting one or more OAM transmissions based on the OAM capability information received from the first communication device.

67. The method of claim 66, wherein the OAM capability information further comprises correctional parameters indicating a maximal correction in distance and per axis, the method further comprising:
using the correctional parameters to adjust the one or more OAM transmissions to the first communication device.

68. The method of claim 66, wherein the OAM capability information comprises a polarizations parameter configured to indicate a quantity of polarizations supported by the first communication device, the method further comprising:
transmitting the one or more OAM transmissions to the first communication device based on the quantity of the polarizations supported by the first communication device.

69. The method of claim 66, wherein the OAM capability information comprises an OAM capability parameter indicating that the first communication device has a third capability to separate different received OAM beams, the method further comprising:
transmitting the one or more OAM transmissions to the first communication device based on the second capability at the first communication device.

70. A non-transitory computer-readable storage medium comprising computer-executable code for wireless communication with a first communication device at a second communication device, the computer-executable code, when executed, causes one or more processors to cause the second communication device to:
receive orbital angular momentum (OAM) capability information indicating a first capability to receive an OAM waveform and a second capability to correct misalignments of OAM waveforms at the first communication device; and
transmit one or more OAM transmissions based on the OAM capability information received from the first communication device.

71. The non-transitory computer-readable storage medium of claim 70, wherein the OAM capability information further comprises correctional parameters indicating a maximal correction in distance and per axis, and wherein the computer-executable code, when executed, further causes the one or more processors to cause the second communication device to:

use the correctional parameters to adjust the one or more OAM transmissions to the first communication device.

72. The non-transitory computer-readable storage medium of claim 70, wherein the OAM capability information comprises a polarizations parameter indicating a quantity of polarizations supported by the first communication device, and wherein the computer-executable code, when executed, further causes the one or more processors to cause the second communication device to:

transmit the one or more OAM transmissions to the first communication device based on the quantity of the polarizations supported by the first communication device.

73. The non-transitory computer-readable storage medium of claim 70, wherein the OAM capability information comprises an OAM capability parameter indicating that the first communication device has a third capability to separate different received OAM beams, and wherein the computer-executable code, when executed, further causes the one or more processors to cause the second communication device to:

transmit the one or more OAM transmissions to the first communication device based on the second capability at the first communication device.

74. An apparatus for wireless communication with a first communication device at a second communication device, comprising:

one or more memories; and
one or more processors coupled to the one or more memories, the one or more processors configured to cause the second communication device to:
receive orbital angular momentum (OAM) capability information configured to indicate a first capability to receive an OAM waveform and a misalignment corrections parameter configured to indicate a lack of a second capability to correct misalignments of OAM waveforms at the first communication device; and
transmit one or more non-OAM transmissions based on the lack of the second capability at the first communication device.

75. The apparatus of claim 74, wherein the one or more processors are configured, individually or in combination, to receive the OAM capability information configured to indicate the first capability to receive the OAM waveform and the misalignment corrections parameter configured to indicate the lack of the second capability to correct the misalignments of the OAM waveforms at the first communication device, and to transmit the one or more non-OAM transmissions based on the lack of the second capability at the first communication device.

76. A method of wireless communication with a first communication device at a second communication device, comprising:

receiving orbital angular momentum (OAM) capability information indicating a first capability to receive an OAM waveform and a misalignment corrections parameter indicating a lack of a second capability to correct misalignments of OAM waveforms at the first communication device; and
transmitting one or more non-OAM transmissions based on the lack of the second capability at the first communication device.

77. A non-transitory computer-readable storage medium comprising computer-executable code for wireless communication with a first communication device at a second communication device, the computer-executable code, when executed, causes one or more processors to cause the second communication device to:

receive orbital angular momentum (OAM) capability information indicating a first capability to receive an OAM waveform and a misalignment corrections parameter indicating a lack of a second capability to correct misalignments of OAM waveforms at the first communication device; and
transmit one or more non-OAM transmissions based on the lack of the second capability at the first communication device.

* * * * *